US012719064B2

(12) United States Patent
Reffelt

(10) Patent No.: US 12,719,064 B2
(45) Date of Patent: Aug. 25, 2026

(54) THREE-DIMENSIONAL PLATES WITH CURVING FLUID CHANNELS FOR STACK SYSTEMS

(71) Applicant: PLUG POWER INC, Latham, NY (US)

(72) Inventor: Anthony Reffelt, Latham, NY (US)

(73) Assignee: Plug Power Inc., Latham, NY (US)

( * ) Notice: Subject to any disclaimer, the term of this patent is extended or adjusted under 35 U.S.C. 154(b) by 608 days.

(21) Appl. No.: 18/341,819

(22) Filed: Jun. 27, 2023

(65) Prior Publication Data

US 2025/0006954 A1 Jan. 2, 2025

(51) Int. Cl.

*H01M 8/0258* (2016.01)
*C25B 9/75* (2021.01)
*H01M 8/24* (2016.01)

(52) U.S. Cl.

CPC ........... *H01M 8/0258* (2013.01); *H01M 8/24* (2013.01); *C25B 9/75* (2021.01)

(58) Field of Classification Search

CPC ........................................ H01M 8/0247–0265
See application file for complete search history.

(56) References Cited

U.S. PATENT DOCUMENTS 3,773,843 A 11/1973 Schmerling
6,344,290 B1 2/2002 Bossel
6,686,079 B2 2/2004 Zhang et al.
6,773,843 B2 8/2004 Kitagawa et al.
2002/0034668 A1* 3/2002 Zhang ................. H01M 8/2432 429/417
2011/0223508 A1 9/2011 Arnold
2022/0278347 A1* 9/2022 Harvey ................. H01M 8/249

FOREIGN PATENT DOCUMENTS

CN 209607841 U * 11/2019
CN 113140748 A * 7/2021 .......... H01M 8/0265
JP 2004-047155 A 2/2004

OTHER PUBLICATIONS

CN209607841U—machine translation (Year: 2019).*
CN113140748A—machine translation (Year: 2021).*
Marappan et al., "Performance Studies of Proton Exchange Membrane Fuel Cells with Different Flow Field Designs—Review", Chemical Record, 21, pp. 663-714 (Year: 2021).

* cited by examiner

*Primary Examiner* — Haroon S. Sheikh
(74) *Attorney, Agent, or Firm* — Victor Cardona, Esq; Heslin Rothenberg Farley & Mesiti P.C.

(57) ABSTRACT

Plate structures and plate assemblies are provided for stack systems, including fuel cell stack systems and/or electrolyzer stack systems. The plate structures have a non-planar, three-dimensional shape, and include a circumferential end and a center end which are vertically offset, with a wall structure connecting the circumferential end and center end. A plurality of curving fluid channels are provided on at least one side of the wall structure between the circumferential end and the center end. The circumferential end includes multiple outer fluid transport openings through the plate structure and the center end includes multiple inner fluid transport openings through the plate structure. One or more outer fluid transport openings and one or more inner fluid transport openings facilitate, at least in part, flow of a fluid across the plate structure between the circumferential end and center end through the plurality of curving fluid channels.

24 Claims, 19 Drawing Sheets

THREE-DIMENSIONAL PLATES WITH CURVING FLUID CHANNELS FOR STACK SYSTEMS

TECHNICAL FIELD

The present invention relates generally to stack systems, including fuel cell stack systems and electrolyzer stack systems, and more particularly, to stack systems with non-planar, three-dimensional plate structures, as well as to stack systems with enhanced center fastener configurations and to stack systems with enhanced fluid flow through the cell stack.

BACKGROUND

By way of example, fuel cell stack systems have fuel cells that electrochemically convert fuels and oxidants to electricity and heat, and can be categorized according to the type of electrolyte (e.g., solid oxide, molten carbonate, alkaline, phosphoric acid or solid polymer) used to accommodate ion transfer during operation. Moreover, fuel cell assemblies can be employed in many environments (e.g., automotive to aerospace to industrial to residential environments), for multiple applications.

A Proton Exchange Membrane (hereinafter "PEM") fuel cell converts the chemical energy of fuels, such as hydrogen, and oxidants, such as air, directly into electrical energy. The PEM is a sold polymer electrolyte that permits the passage of protons (i.e., H+ ions) from the "anode" side of the fuel cell to the "cathode" side of the fuel cell, while preventing passage of reactant fluids (e.g., hydrogen and air gases). The Membrane Electrode Assembly (hereinafter "MEA") is placed between two electrically conductive plates or plate assemblies, which have, for instance, a flow passage to direct the fuel to the anode side and oxidant to the cathode side of the PEM.

Two or more fuel cells may be connected together to increase the overall power output of the assembly. Generally, the cells are connected in series, with (in one embodiment) one side of a plate serving as an anode plate for one cell and the other side of the plate serving as the cathode plate for the adjacent cell. These are commonly referred to as bipolar plates. Alternately, the anode plate of one cell is electrically connected to the separate cathode plate of an adjacent cell. Commonly, these plates are connected back to back as a plate assembly and are often bonded together (e.g., bonded by adhesive, weld, or polymer). This bonded pair becomes as one, also commonly called a bipolar plate or bipolar plate assembly, since anode and cathode plates represent the positive and negative poles, electrically. Such a series of connected multiple fuel cells is referred to as a fuel cell stack. Within the stack, the fuel and the oxidant are directed to the anode and cathode flow field channels, respectively. Further, the stack can include a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack can also include an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

Fuel cell plates are typically formed as substantially rectangular plates with flow fields on opposite sides of the plates to form bipolar plates. The flow fields may include long parallel channels with right-angle turns and multiple bends, which may result in various pressure drops, chances for racetrack skipping, and water entrapment, thereby decreasing efficiency of the corresponding fuel cell(s) and/or requiring maintenance to mitigate such issues.

SUMMARY

The present invention provides, in one aspect, a stack system which includes multiple cells and associated plate structures arranged in a cell stack. A plate structure of the multiple cells and associated plate structures has a non-planar, three-dimensional shape, and includes a circumferential end and a center end, which are vertically offset, with a wall structure extending between and connecting the circumferential end and the center end. Further, the plate structure includes a plurality of curving fluid channels on at least one side of the wall structure extending between the circumferential end and the center end. The circumferential end includes multiple outer fluid transport openings through the plate structure, and the center end includes multiple inner fluid transport openings through the plate structure. One or more outer fluid transport openings of the multiple outer fluid transport openings and one or more inner fluid transport openings of the multiple inner fluid transport openings facilitate, at least in part, flow of a fluid across the plate structure between the circumferential end and the center end through the plurality of curving fluid channels.

In one embodiment, the plurality of curving fluid channels include a first set of curving fluid channels on one side of the wall structure extending between the circumferential end and the center end, and a second set of curving fluid channels on another side of the wall structure extending between the circumferential end and the center end. In one or more embodiments, the first set of curving fluid channels on the one side of the wall structure are differently configured from the second set of curving fluid channels on the other side of the wall structure.

In one or more embodiments, the wall structure extending between the circumferential end and the center end provides, in part, the non-planar, three-dimensional shape to the plate structure. In one example, the wall structure extends uniformly between the circumferential end and the center end. In a further example, the wall structure curves uniformly between the circumferential end and the center end. In still another embodiment, the wall structure curves non-uniformly between the circumferential and the center end. Many variations in wall structure configuration are possible, alone or in combination with variations in the plurality of curving fluid channels on one side or the other side of the wall structure. Advantageously, the typical x-y planar flow fields are improved with the wall structure extending, at least in part, in the z-axis direction, providing the plate structure with the non-planar, three-dimensional shape.

For instance, in one or more embodiments, the plurality of curving fluid channels include a plurality of parallel curving fluid channels on the at least one side of the wall structure extending between the circumferential end and the center end. In one or more further embodiments, spacing between adjacent curving fluid channels of the plurality of curving fluid channels on the at least one side of the wall structure varies between the circumferential end and the center end. For instance, in one or more embodiments, spacing decreases between adjacent curving fluid channels of the plurality of curving fluid channels on the at least one side of the wall structure from the circumferential end to the center end of the plate structure.

In one or more implementations, cross-sectional area of one or more curving fluid channels of the plurality of curving fluid channels varies between the circumferential end and the center end. Further, in one or more implementations, two or more adjacent, curving fluid channels of the plurality of curving fluid channels on the at least one side of the wall structure can merge between the circumferential end and the center end into a single fluid channel.

In one embodiment, the circumferential end is a circular circumferential end and the center end is a circular center end, with the stack system being a cylindrical-shaped stack system.

In a further aspect, plate assemblies are disclosed herein which have a non-planar, three-dimensional shape. The plate assemblies include a first plate structure and a second plate structure sealed together to form the plate assembly, with the first and second plate structures each being a plate structure such as described herein.

The present invention provides, in another aspect, a stack system which includes multiple cells and associated plate assemblies arranged in a cell stack. A plate assembly of the multiple cells and associated plate assemblies has a non-planar, three-dimensional shape, and includes a first plate structure and a second plate structure sealed together to form the plate assembly. The first and second plate structures each include a circumferential end and a center end, which are vertically offset, with a wall structure extending between and connecting the circumferential end and the center end. Further, a plurality of curving fluid channels are provided on at least one side of the wall structure extending between the circumferential end and the center end. The circumferential end includes multiple outer fluid transport openings through the plate structure, and the center end includes multiple inner fluid transport openings through the plate structure. One or more outer fluid transport openings of the multiple outer fluid transport openings and one or more inner fluid transport openings of the multiple inner fluid transport openings facilitate, at least in part, flow of a fluid, across the plate structure between the circumferential end and the center end through the plurality of curving fluid channels.

In a further embodiment, a fuel cell stack system is provided which includes a plurality of stacked fuel cells. The plurality of stacked fuel cells include a plurality of membrane electrode assemblies and one or more plate assemblies. A plate assembly of the one or more plate assemblies has a non-planar, three-dimensional shape, and is disposed between membrane electrode assemblies of adjacent fuel cells of the plurality of stacked fuel cells. The plate assembly includes a first plate structure and a second plate structure sealed together to form the plate assembly. The first and second plate structures each include a circumferential end and a center end which are vertically offset, with a wall structure extending between and connecting the circumferential end and the center end. Further, each plate structure includes a plurality of curving fluid channels on at least one side of the wall structure extending between the upper circumferential and the center end. The circumferential end includes multiple outer fluid transport openings through the plate structure and the center end includes multiple inner fluid transport openings through the plate structure. One or more outer fluid transport openings of the multiple outer fluid transport openings and one or more inner fluid transport openings of the multiple inner fluid transport openings facilitate, at least in part, flow of a fluid across the plate structure between the circumferential end and the center end through the plurality of curving fluid channels.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
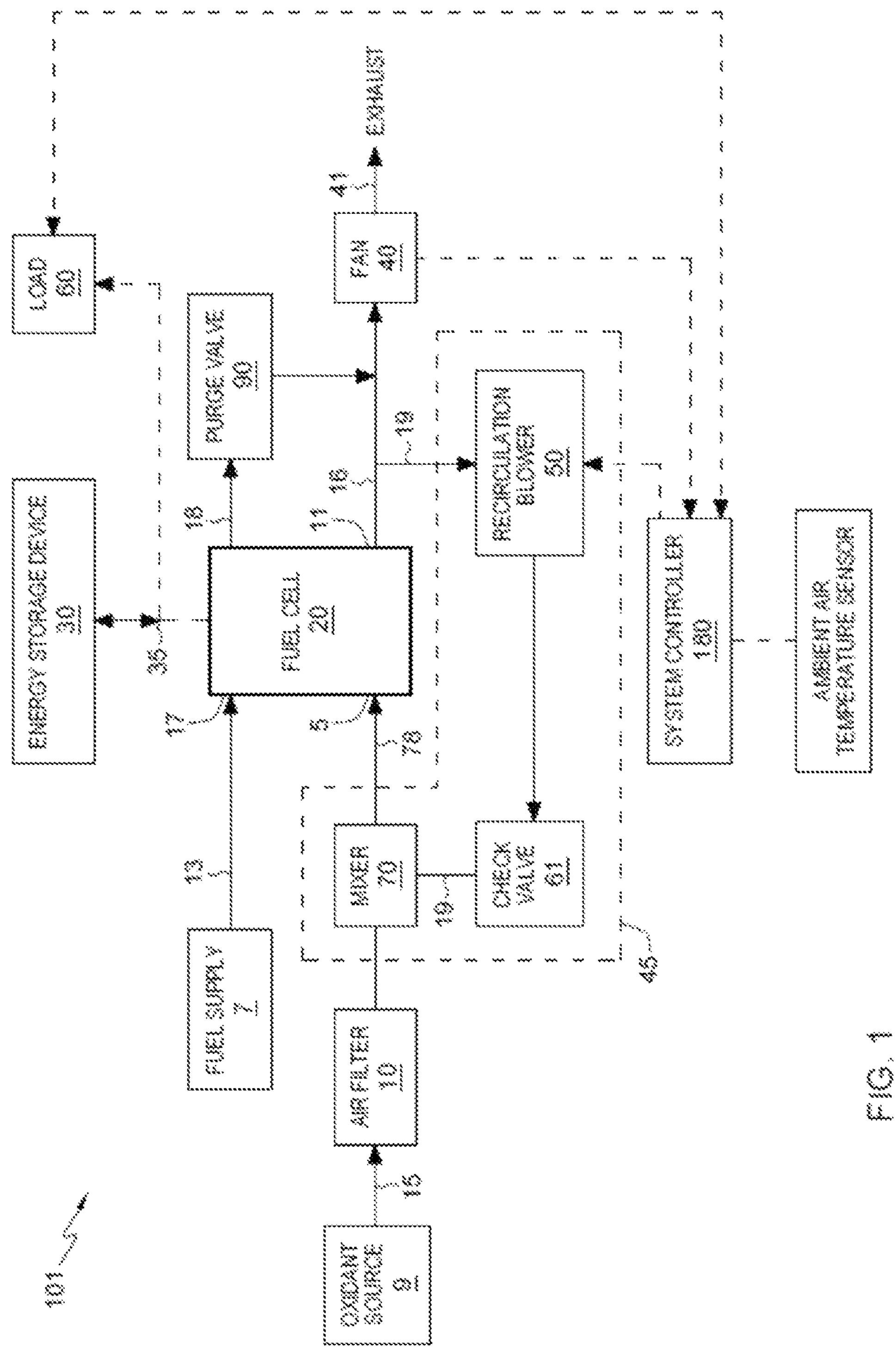
FIG. 1 is a block diagram of one embodiment of a fuel cell system, which can include plate structures in accordance with one or more aspects the present invention.

The accompanying figures, which are incorporated in and form a part of this specification, further illustrate the present invention and, together with this detailed description of the invention, serve to explain aspects of the present invention. Note in this regard that descriptions of well-known systems, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

The present invention is discussed herein in detail in terms of various exemplary embodiments with reference to the accompanying drawings. In the following detailed description, numerous specific details are set forth in order to provide a thorough understanding of the present invention. It will be obvious, however, to those skilled in the art that the present invention may be practiced without one or more of these specific details. In other instances, well-known structures are not shown in detail in order to avoid unnecessary obscuring of the present invention.

The implementations described below are exemplary implementations provided to enable persons skilled in the art to make or use the embodiments of the disclosure and are not intended to limit the scope of the disclosure, which is defined by the claims. For instance, the embodiments of the plate structures and plate assemblies disclosed herein can be used in variety of stack systems, including in fuel cell stack systems, as well as electrolyzer stack systems. The inventive aspects (including the plate structures/assemblies, the fastener configurations, the fluid flow configurations, etc.) are discussed principally herein in connection with fuel cell stack systems, by way of example only. In one or more other implementations, the plate structures, and plate assemblies, as well as the fastener configurations, and fluid flow configurations, can be used in association with various electrolyzer stack system implementations, as well. Note that as used herein, a stack system can be either a fuel cell stack system or an electrolyzer stack system, unless otherwise noted. Also, a cell stack can be part of a fuel cell stack system or an electrolyzer stack system, unless otherwise noted.

Note that, as used herein, the word "exemplary" or "illustrative" means "serving as an example, instance, or illustration." Any implementation described herein as "exemplary" or "illustrative" is not necessarily to be construed as preferred or advantageous over other implementations.

Furthermore, there is no intention to be bound by any express or implied theory presented in the preceding technical field, background, summary or the following detailed description. It is also to be understood that the specific stack systems, cell stacks, devices and processes illustrated in the attached drawings, and described in the following specification, are simply exemplary embodiments of the inventive concepts defined in the appended claims. Hence, specific dimensions and other physical characteristics relating to the embodiments disclosed are not to be considered as limiting, unless the claims expressly state otherwise.

Before describing embodiments of plate structures, plate assemblies and stack systems in accordance with one or more aspects of the present invention, a fuel cell system, a portion of a fuel cell system, and a conventional fuel cell stack of a fuel cell system are respectively discussed below with reference to FIGS. 1-3, by way of example only.

In FIG. 1, an exemplary fuel cell system 101 is shown which functions to produce electricity for powering a load 60. Fuel cell system 101 includes a fuel cell stack 20, or cell stack, and an energy storage device 30. Fuel cell stack 20 is supplied with a fuel 13, for example, hydrogen, through a fuel inlet 17. Excess fuel 18 is exhausted from the fuel cell stack through a purge valve 90, and can be diluted by a fan 40. In one example, fuel cell stack 20 can have an open cathode architecture of a PEM fuel cell, and combined oxidant and coolant, for example, air, can enter through an inlet air filter 10 coupled to an inlet 5 of fuel cell stack 20. Excess coolant/oxidant 16 and heat is exhausted from a fuel cell cathode of fuel cell stack 20 through an outlet 11 to fan 40, which can exhaust the coolant/oxidant and/or excess fuel to a waste exhaust 41, such as the ambient atmosphere. In one embodiment, fuel cell system 101 can also include a recirculation sub-assembly 45, including a recirculation blower 50 (controlled by a system controller 180), as well as a check valve 61 and a mixer 70 for controllably recirculating, at least in part, excess coolant/oxidant 16 to inlet 5 of fuel cell stack 20. The fuel and coolant/oxidant can be supplied by a fuel supply 7 and an oxidant source 9 (e.g., air), respectively, and other components of a balance of plant, which can include compressors, pumps, valves, fans, electrical connections and sensors.

Figure 2:
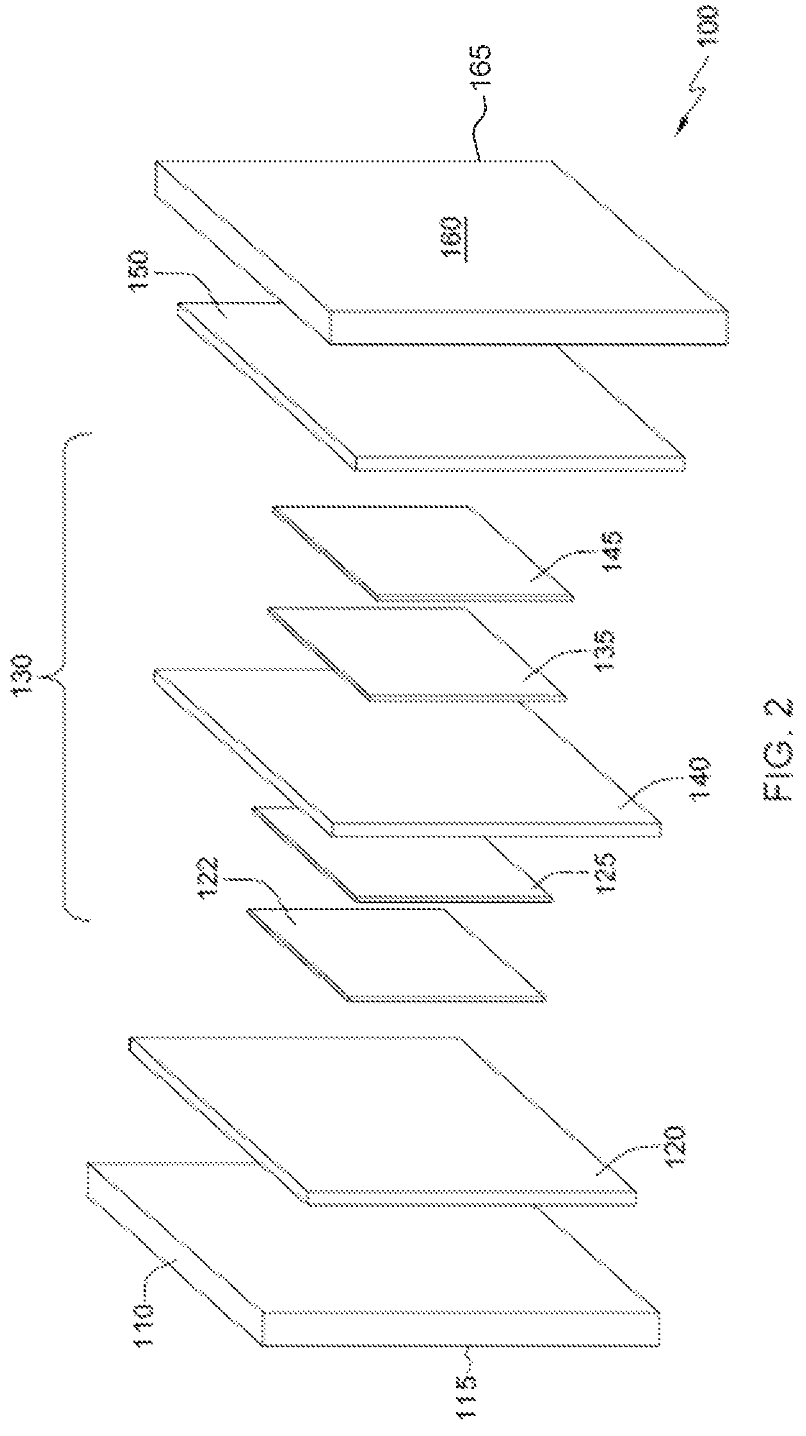
FIG. 2 is a perspective view of one embodiment of a portion of a fuel cell of a fuel cell system, such as the fuel cell system of FIG. 1.

FIG. 2 depicts an exploded schematic view of an internal subassembly 100 of a portion of fuel cell stack 20 of FIG. 1, including a cathodic plate separator 110 at an outer end 115 and a plate separator seal 120 on an inner side thereof. A membrane electrode assembly (MEA) 130 is located between seal 120 and a second plate separator seal 150. An anode plate separator 160 is at a second end 165 of subassembly 100.

In the depicted embodiment, membrane electrode assembly (MEA) 130 includes a membrane 140 (e.g., an ion conducting membrane) between a cathode side catalyst layer 125 and an anode side catalyst layer 135. A cathode side gas diffusion layer (GDL) 122 is located between cathode side catalyst layer 125 of the membrane electrode assembly and plate separator 110. An anode side gas diffusion layer 145 is located between anode side catalyst layer 135 of the membrane electrode assembly and plate separator 160. Seals 120, 150 can be received in a channel on a respective inner side of plate separators 110, 160, respectively. In another example, such seals can be injection molded around a membrane electrode assembly (e.g., membrane electrode assembly 130) or another fuel cell component.

Figure 3:
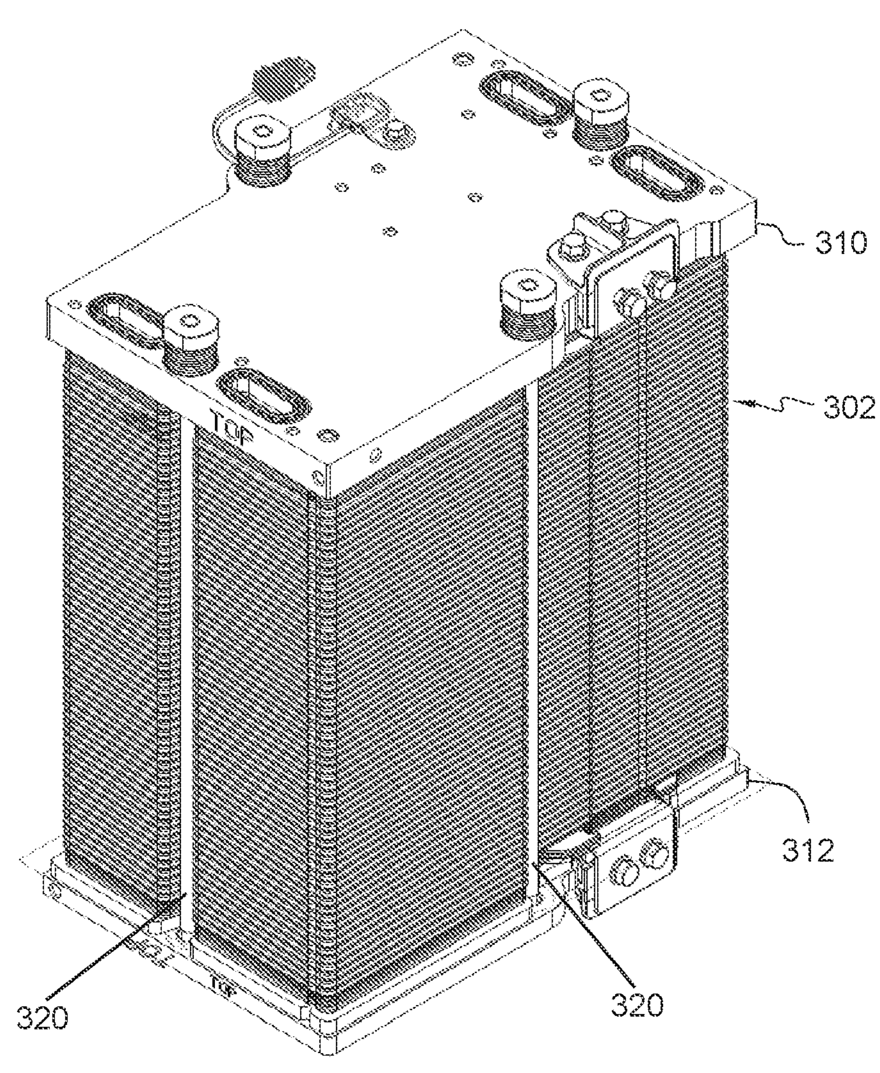
FIG. 3 is a perspective view of one embodiment of a conventional stack system.

By way of further example, FIG. 3 depicts one embodiment of a fuel cell stack or a fuel cell stack system 300 which includes a stack up of a plurality of fuel cells 302, such as a plurality of Proton Exchange Membrane fuel cells disposed between upper end plate 310 and a base end plate 312, with a plurality of peripheral fasteners 320 securing the stack system together with, for instance, a compressive load on the fuel cell stack 302. The cell stack, such as a proton exchange membrane fuel cell (PEMFC) stack, includes bipolar plates, electrodes, catalysts, membranes, and hardware components, such as current collectors and gaskets. The bipolar of plates can be made of a variety of different types of materials, such as metal, coated metal, graphite, carbon composite, carbon-polymer composites, etc. The membrane electrode assemblies can include a proton exchange membrane positioned between two catalyst-coated layers, such as two catalyst-coated carbon papers. Platinum and/or similar type of noble metals can be used as a catalyst for the PEMFC.

Conventionally, fuel cells for a fuel cell stack system such as depicted in FIG. 3 are configured as rectangular-shaped, planar plate structures or assemblies that have flow channels in a variety of configurations on the planar structures. For instance, the flow channels or fields can include long parallel channels with right-angle turns and/or multiple bends. As noted however, such structures can result in various pressure drops through the flow channels, with racetrack skipping potential, and water entrapment, potentially decreasing efficiency of the fuel cell, and/or requiring maintenance to mitigate the issue(s). A variety of methods exist for mitigating possible fluid entrapment within channels of a planar plate assembly. In one embodiment, the plate structure can be a metal or graphite plate structure with a flow field having curved bends to keep the flow normalized across the surface of the planar extending plate. In another embodiment, posts can be formed into flow channels to facilitate normalized flow around bends to mitigate uneven flow and fluid entrapment.

Disclosed herein, in one aspect, are new types of stack systems which use plate structures/assemblies (i.e., flow field plates) that have a non-planar, three-dimensional shape, as well as stack end plates configured to allow the plate structures/assemblies to be compressed in the stack system. Note that the plate structures or plate assemblies (as used herein) refer to, for instance, plate structures or plate assemblies of a fuel cell stack system or an electrolyzer stack system. In one or more implementations, the plate structures and/or plate assemblies are circular-shaped in plan view, and the resultant stack system is a cylindrical-shaped stack system in contrast to the typical rectangular-shaped stack systems.

In one or more aspects, stack systems, including fuel cell stack systems and electrolyzer stack systems, are disclosed herein which include multiple cells and associated plate structures arranged in a cell stack. One or more plate structures and/or plate assemblies of the cell stack have a non-planar, three-dimensional shape with a non-planar, three-dimensional flow field. In one or more implementations, the plate structure includes a circumferential end and a center end, where the circumferential end is vertically offset from the center end (such that the plate structure extends in the z axis direction). In one or more embodiments, the circumferential end is an upper circumferential end, and the center end is a lower center end. In one or more other embodiments, the circumferential end is a lower circumferential end, and the center end is an upper center end.

A wall structure extends between and connects the circumferential end and the center end. Further, a plurality of curving fluid channels (i.e., curing fluid transport channels or flow field channels) on at least one side of the wall structure extend (e.g., curve) between the circumferential end and the center end. The circumferential end includes multiple outer fluid transport openings through the plate structure, and the lower center includes multiple inner fluid transport openings through the plate structure. One or more outer fluid transport openings of the multiple outer fluid transport openings and one or more inner fluid transport openings of the multiple inner fluid transport openings facilitate, at least in part, flow of a fluid across the plate structure between the circumferential end and the center end through the plurality of curving fluid channels.

In one embodiment, the plurality of curving fluid channels include a first set of curving fluid channels on one side of the wall structure extending between the circumferential end and the center end, and a second set of curving fluid channels on another side of the wall structure extending between the circumferential end and the center end. In one or more embodiments, the first set of curving fluid channels on the one side of the wall structure are differently configured from the second set of curving fluid channels on the other side of the wall structure.

In one or more embodiments, the wall structure extending between the circumferential end and the center end provides, in part, the non-planar, three-dimensional shape to the plate structure. In one example, the wall structure extends uniformly between the circumferential end and the center end. In a further example, the wall structure curves uniformly between the circumferential end and the center end. In still another embodiment, the wall structure curves non-uniformly between the circumferential and the center end. Many variations in wall structure configuration are possible, alone or in combination with variations in the plurality of curving fluid channels on one side or the other side of the wall structure. Advantageously, the typical x-y planar flow fields are improved with the wall structure extending, at least in part, in the z-axis direction, providing the plate structure with the non-planar, three-dimensional shape.

For instance, in one or more embodiments, the plurality of curving fluid channels include a plurality of parallel curving fluid channels on the at least one side of the wall structure extending between the circumferential end and the center end. In one or more further embodiments, spacing between adjacent curving fluid channels of the plurality of curving fluid channels on the at least one side of the wall structure varies between the circumferential end and the center end. For instance, in one or more embodiments, spacing decreases between adjacent curving fluid channels of the plurality of curving fluid channels on the at least one side of the wall structure from the circumferential end to the center end of the plate structure.

In one or more implementations, cross-sectional area of one or more curving fluid channels of the plurality of curving fluid channels varies between the circumferential end and the center end. Further, in one or more implementations, two or more adjacent, curving fluid channels of the plurality of curving fluid channels on the at least one side of the wall structure can merge between the circumferential end and the center end into a single fluid channel.

In one embodiment, the circumferential end is a circular circumferential end and the center end is a circular center end, with the stack system being a cylindrical-shaped stack system.

In a further aspect, plate assemblies are disclosed herein which have a non-planar, three-dimensional shape. The plate assemblies include a first plate structure and a second plate structure sealed together to form the plate assembly, with the first and second plate structures each being a plate structure such as described herein.

Figure 4A:
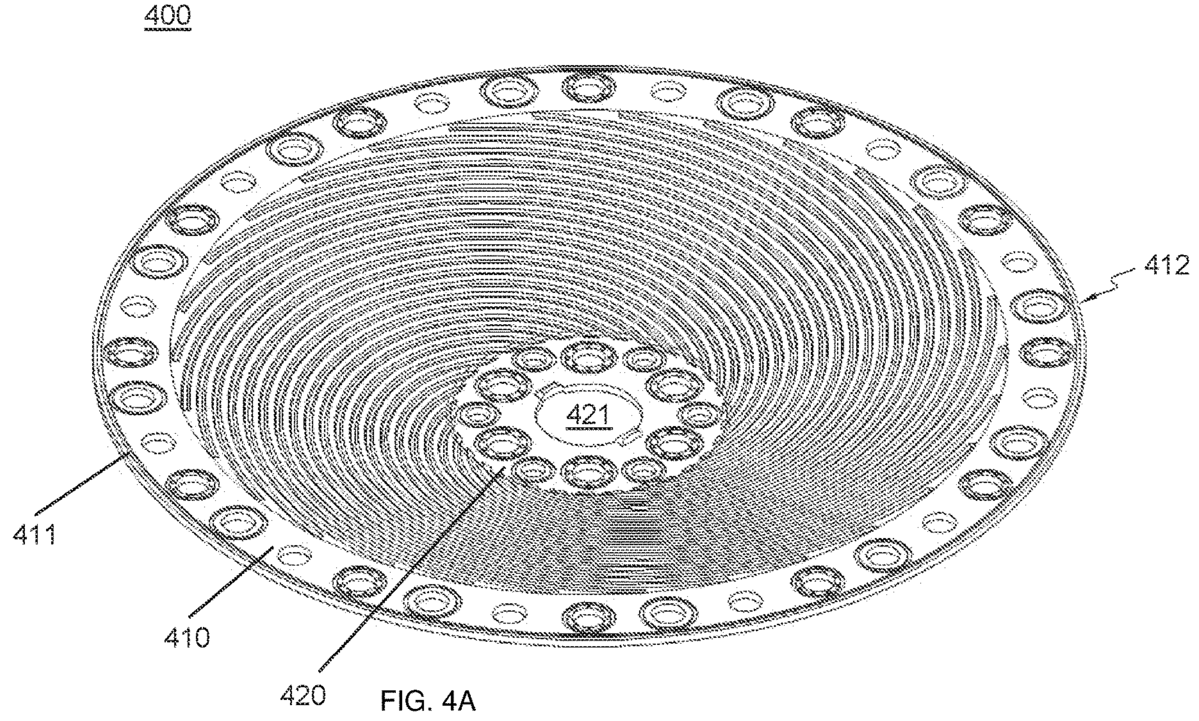
FIGS. 4A-4H depict one embodiment of a plate structure of a stack system, in accordance with one or more aspects of the present invention.
Figure 4B:
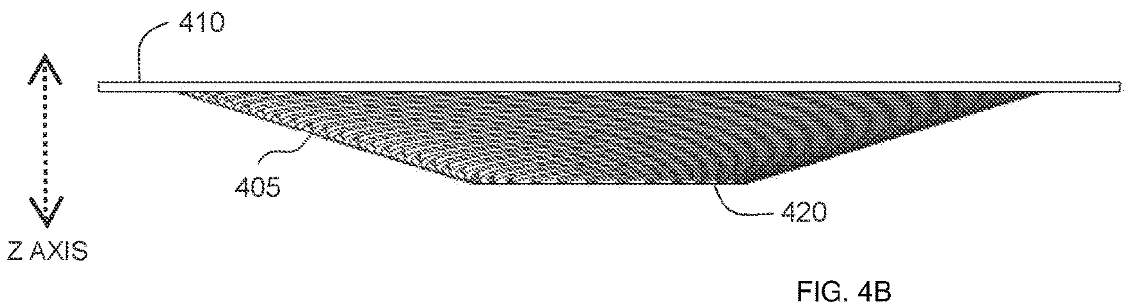

By way of example, FIGS. 4A-4H depict one embodiment of a plate structure or flow field plate (such as a bipolar plate), for a stack system, such as disclosed herein. Referring initially to FIGS. 4A-4B, in one embodiment, plate structure 400 is conical-shaped, as shown, and includes a circumferential end 410 at a periphery 412 of plate structure 400 and a center end 420 at a center region of plate structure 400. By way of example, in the embodiment illustrated, center end 420 is below circumferential end 410 in the z-axis direction, with a uniform, conical-shaped wall structure 405 extending between and connecting circumferential end 410 and center end 420, as shown in FIG. 4B. In one or more other embodiments, center end 420 can be above circumferential end 410 in the z axis direction, with a wall structure extending between and connecting the circumferential and center ends.

In one embodiment, plate structure 400 includes a mating seal 411 about periphery 412 configured to matably seal to an adjacent, interfacing plate structure (not shown) of the stack system. Further, as illustrated, plate structure 400 includes (in one embodiment) a center opening 421 within center end 420, which is sized and positioned to allow a center fastener to extend therethrough, as well as a flow of a fluid therethrough, such as described below with reference to FIGS. 6A-6D.

Figures 4C, 4D:
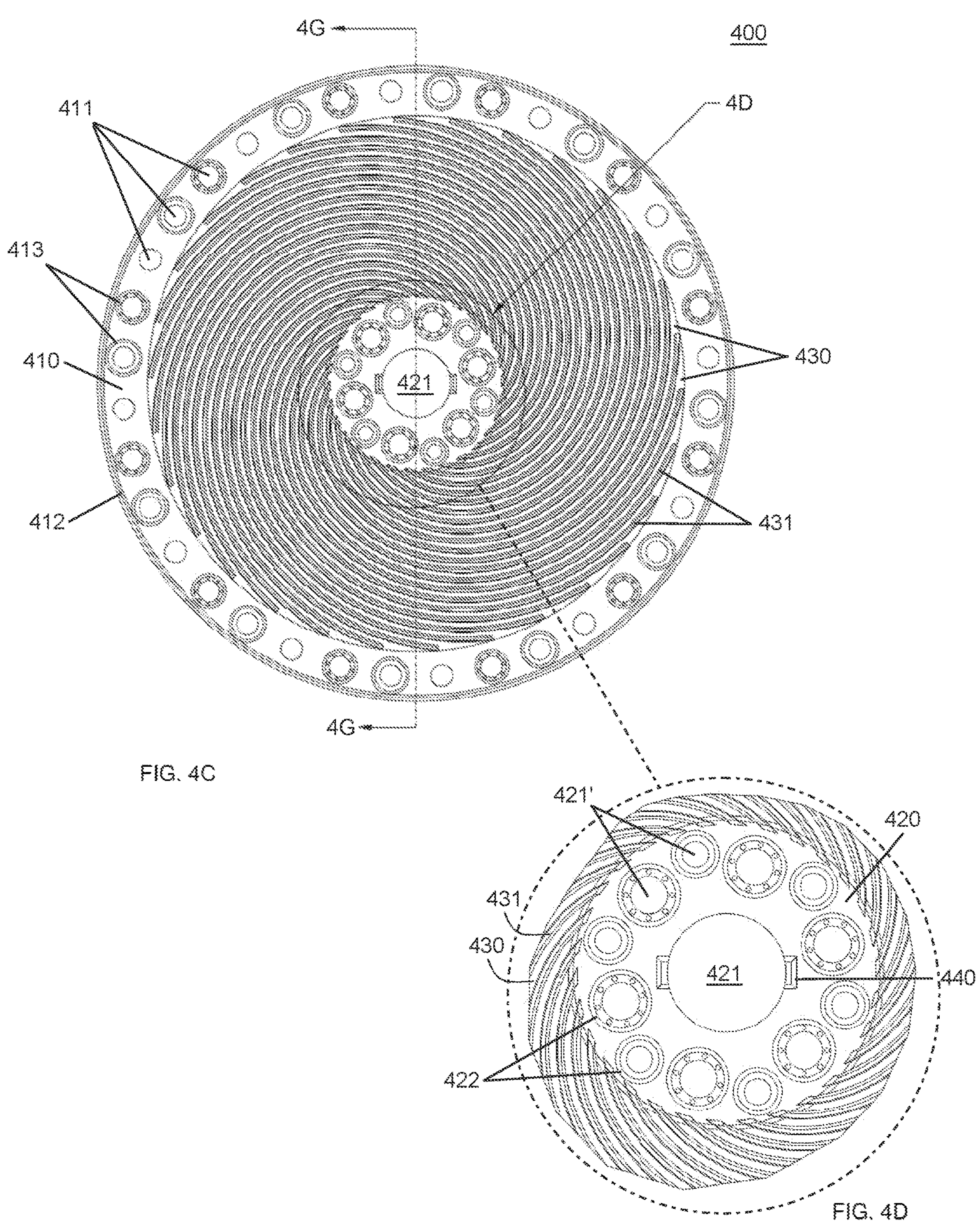

FIG. 4C is a top plan view of plate structure 400 of FIGS. 4A-4B, and FIG. 4D is a partial enlargement of center end 420 of the plate structure of FIG. 4C taken along line 4D. As illustrated in FIGS. 4C-4D, circumferential end 410 includes (in one embodiment) multiple outer fluid transport openings 411 through plate structure 400, and center end 420 includes multiple inner fluid transport openings 421, 421' through plate structure 400. In addition, a plurality of curving fluid channels 430 (i.e., curving fluid transport channels or flow field channels) are provided on at least one side of the wall structure extending between and connecting circumferential end 410 and center end 420. The plurality of curving fluid channels 430 are defined between raised lands 431 on an upper surface of the wall structure, in one embodiment, as illustrated in FIGS. 4C-4D. Further, as illustrated in the cross-sectional embodiment of FIG. 4G, taken along line 4G-4G of FIG. 4C, and the enlarged partial depiction thereof of FIG. 4H, plate structure 400 can include, in addition to the plurality of curving fluid channels on the upper surface of the wall structure 405, another plurality of curving fluid channels 430' on the lower side of wall structure 405, in one or more embodiments. The pluralities of curving fluid channels 430, 430' on the different sides of wall structure 405 can be similarly configured, or differently configured, as desired, or required, for fluid flow in a particular stack system implementation.

Depending on the implementation, different-aligned outer fluid transport openings 411 and inner fluid transport openings 421, 421' through multiple plate structures in the stack system can accommodate passage of different fluids (e.g., different liquids and/or gasses) though the stack system. For instance, in one or more embodiments, a first set of outer and inner fluid transport openings can be isolated in fluid communication within the cell stack to accommodate flow of a first reactant through the stack system, a second set of outer and inner fluid transport openings can be isolated in fluid communication within the cell stack to accommodate flow of a second reactant, and a third set of outer and inner fluid transport openings can be isolated in fluid communication within the cell stack to facilitate flow of a coolant through the stack system, by way of example only. For instance, in FIG. 4C, two thirds of the outer fluid transport openings 411 include gaskets 413 around the openings to seal between interfacing plate structures fluid passing through those openings from passing through the plurality of curving fluid channels 430 illustrated on the one side of the wall structure. Gaskets 422 are also provided around inner fluid transport openings 421' at center end 420, in the example depicted. In the embodiment of FIGS. 4C-4D, a gasket is not shown around inner fluid transport opening 421, by way of example. Thus, in the embodiment depicted, fluid flows, in one embodiment, across the depicted side of plate structure 400 between outer fluid transport openings 411 (without gaskets 413) and inner fluid transport opening 421, through the plurality of curving fluid channels 430. Note that in this example, the diameter of inner fluid transport opening 421 is assumed to be large enough to accommodate a center fastener, as well as the flow of fluid around, or through, the center stack fastener, through fluid transport opening 421. Further, note that configurations of the multiple outer fluid transport openings and the multiple inner fluid transport openings can vary between implementations. In one or more embodiments, the fluid transport openings and peripheral seals are circular-shaped, such as depicted in FIGS. 4A-4F, which can facilitate the use of commercially available gaskets, such as commercially available O-rings, for sealing purposes within the stack structure to isolate respective sets of outer and inner fluid transport openings to accommodate flow of the different fluids of the stack system across different flow field surfaces of different plate structures in the stack system. In one or more other embodiments, the fluid transport openings and peripheral seals are non-circular-shaped, such as depicted in the further plate structure example of FIGS. 5A-5D, described below.

Advantageously, fluid channels which curve as illustrated, e.g., in a partial-helical manner, increase the flow field length on the one side of the plate structure compared with, for instance, straight radial channels extending between the circumferential end and the center end. Many variations on this curving fluid channel design are possible. For instance, the plurality of curving fluid channels 430 can include a plurality of parallel curving fluid channels on one or both sides of the wall structure extending between the circumferential end and the center end of the plate structure. In another example, the spacing (or width of the raised lands 431) between adjacent curving fluid channels of the plurality of curving fluid channels on one or both sides of the plate structure can vary between the circumferential end and the center end. Further, in another example, the spacing can decrease between adjacent curving fluid channels of the plurality of curving fluid channels on one or both sides of the plate structure, such as from the circumferential end to the center end. In another implementation, the cross-sectional area of one or more curving fluid channels of the plurality of curving fluid channels 430 can vary between the circumferential end and the center end. Many variations are possible to achieve a desired flow field configuration for one or both sides of the plate structure.

In one example, the fluid to flow across the depicted side of the plate structure of FIGS. 4C-4D can be a reactant, such hydrogen or oxygen, or a coolant, depending on the location of the plate structure within the stack up of fuel cells. Note also that the size of the flow field can depend, in part, on the configuration of the wall structure extending between and connecting the circumferential end and the center end, with the uniform, conical wall structure of FIGS. 4A-4B being one example only. In one or more other implementations, the wall structure can curve uniformly between the circumferential and the center end (e.g., in a semi-spherical shape), can curve non-uniformly between the circumferential end and the center end (e.g., in a curving, trapezoid shape, such as depicted in FIGS. 5A-5D), etc. Many wall structure variations are possible to achieve a desired flow field for the stack system.

Advantageously, in one embodiment, where the plate structure side is accommodating the flow of coolant through the stack system, the plate structure can be configured and the stack system can be oriented so that gravity assists in drainage of the coolant through the plurality of curving fluid channels from the circumferential end to the center end (in the depicted example), with the fluid leaving the plate through one or more aligned inner fluid transport openings in the cell stack. For instance, inner fluid transport opening 421 can be sized to accommodate the center fastener, as well as the flow of coolant about, or within, the center fastener, such as in a downward direction through an outer groove or notch in the center fastener of the stack system, in one embodiment.

In one or more implementations, proper positioning and orienting of interfacing plate structures to align the multiple outer and inner fluid transport openings in respective fluid columns through the compressed stack system is achieved, in one embodiment, using appropriate alignment lands 440 or keys (and gaskets) to assist in aligning the plate to respective alignment recesses of an adjacent, interfacing plate structure. For instance, in one embodiment, one side of plate structure 400 includes alignment lands 440 (or upper projections or keys), and the other side of the plate structure includes corresponding alignment recesses 441 (see FIG. 4F). Note in this regard that, the placement of the alignment lands 440 and the alignment recesses 441 can vary between implementations. In the embodiments of FIGS. 4A-4H, the alignment lands and recesses are located in the center end, but in one or more other embodiments, the alignment lands and recesses can be positioned in the circumferential end, by way of further example. An example of this is depicted in FIGS. 5A-5D. One purpose of the plate alignments within the stack is to ensure that the peripheral gasket(s) and the outer and inner opening gaskets of the adjacent plates seal with the fluid transport openings in fluid communication in the appropriate fluid columns aligned through the stack.

Figures 4E, 4F:
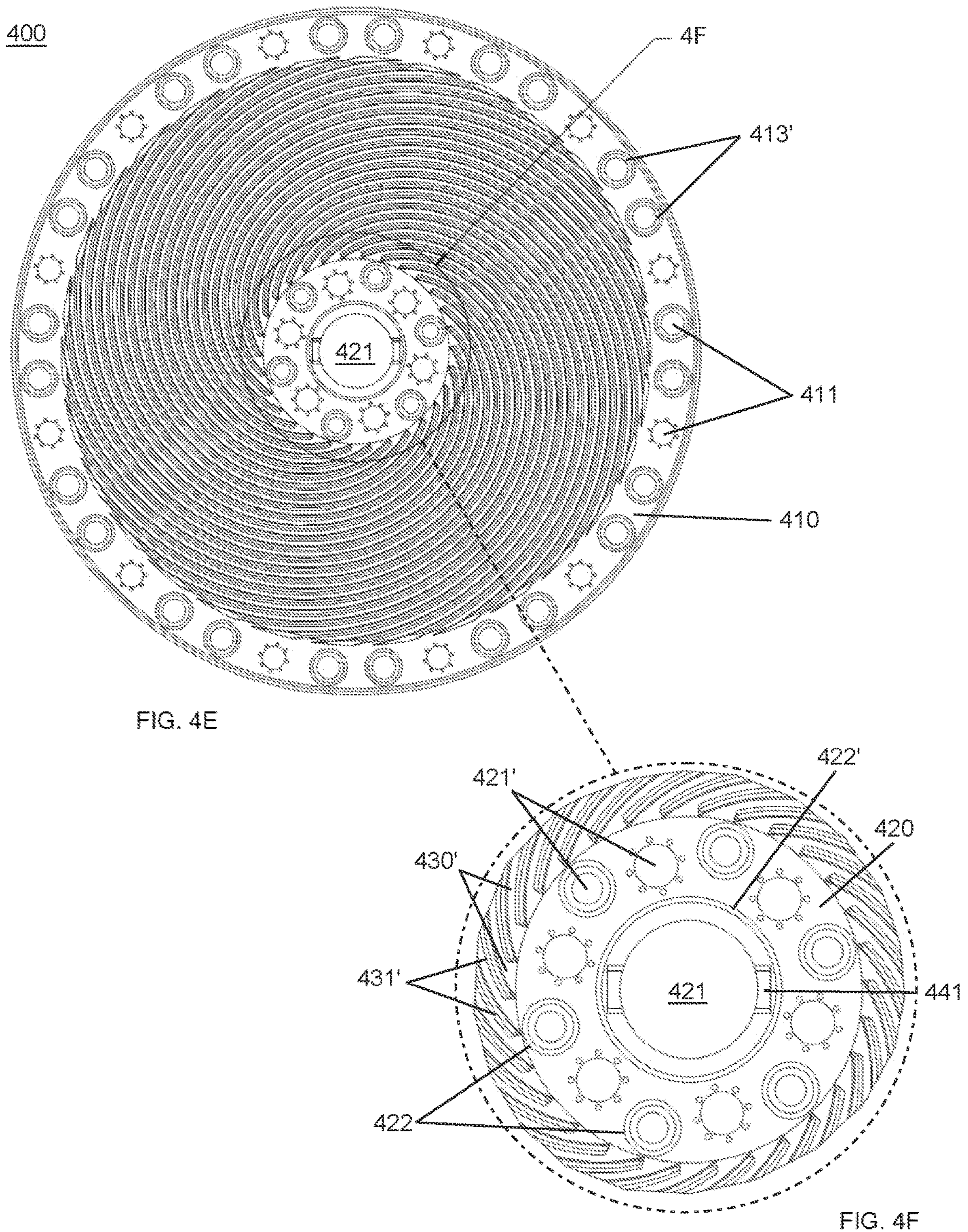
Figures 4G, 4H:
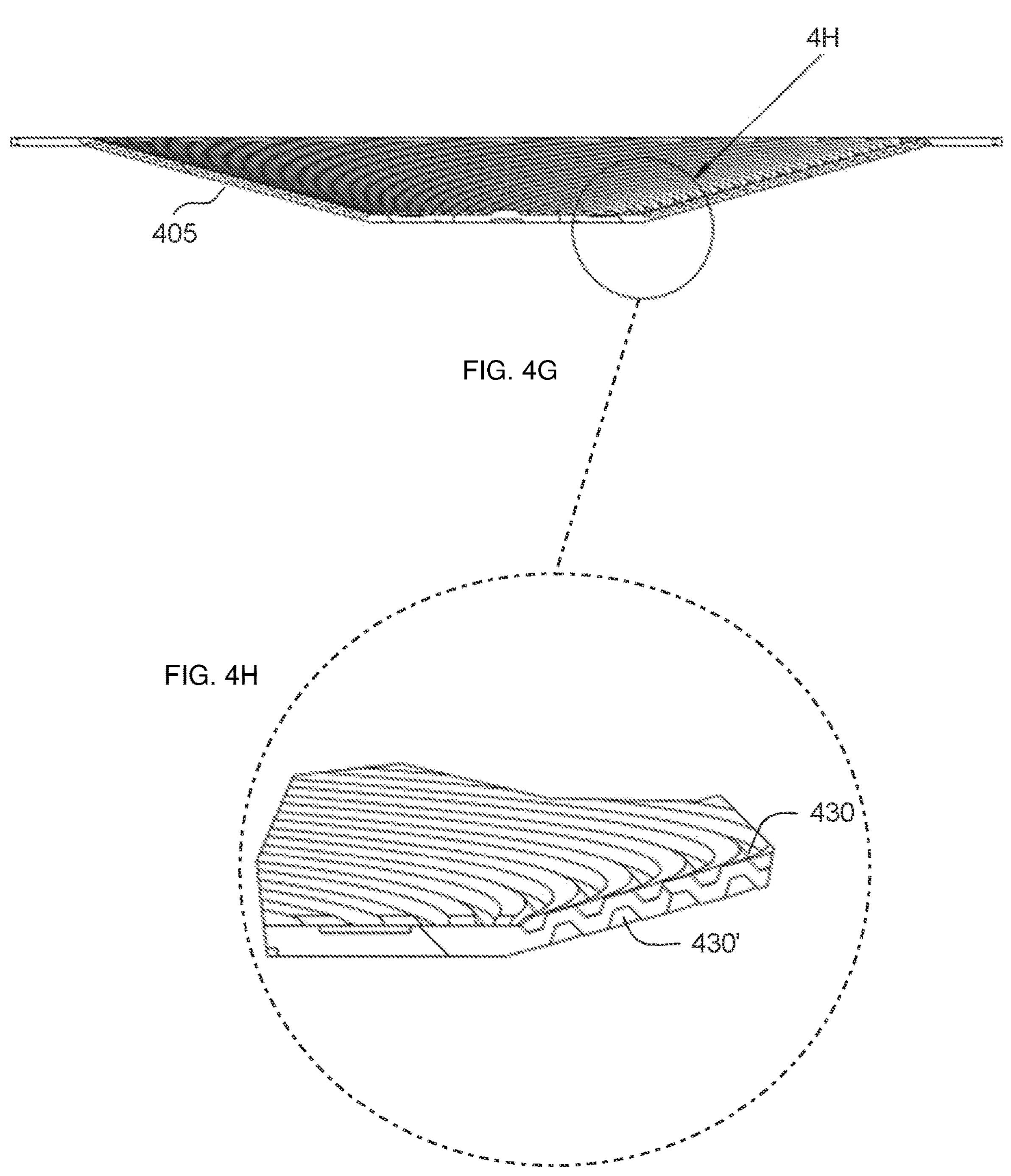

In FIGS. 4E-4F, one embodiment of the lower side of plate structure 400 of FIGS. 4A-4B is illustrated. In the depicted embodiment, the lower side includes, in addition to circumferential end 410 and center end 420, another plurality of curving fluid channels 430' on the wall structure extending between the circumferential end and the center end. Again, this lower side representation of FIGS. 4E-4F depicts one embodiment only of a plate structure, such as a bipolar plate. The depicted plate structure configuration is beneficial where a first fluid is to pass across the upper surface of the plate structure through the first set of curving fluid channels 430 (FIGS. 4C-4D), and a second fluid is to pass across the lower surface of the plate structure through the second set of curving fluid channels 430' (FIGS. 4E-4F). In one or more other embodiments, a plurality of curving fluid channels can be disposed on only one side of the plate structure depending, for instance, on the stack configuration and/or location of the plate structure within the stack system.

Note also that, where there are sets of curving fluid channels on the different sides of the plate structure, the curving fluid channels can be differently configured on the different sides. For instance, in one implementation, the first set of curving fluid channels 430 on the first (e.g., upper) side of the plate structure can accommodate a coolant flow, and the second set of curving fluid channels on the second (e.g., lower) side of the plate structure can accommodate a reactant flow, such as hydrogen or oxygen, depending on fluids in the stack system and the location of the plate structure within the stack system, such as within a fuel cell stack system.

In FIGS. 4E-4F, in one embodiment, a fluid (such as a reactant fluid or a coolant) can flow through the plurality of curving fluid channels 430' between the outer fluid transport openings 411 without gaskets 413 and the inner fluid transport openings 421' without gaskets 422. Depending on the fluid type, and, for instance, whether the fluid is pressurized, fluid flows through the curving fluid channels, that is, across the flow field, either from the unsealed outer fluid transport openings to the unsealed inner fluid transport openings, or from the unsealed inner fluid transport openings to the unsealed outer fluid transport openings, as desired for a particular fluid flow implementation within the stack system. Note in this regard that, in the depicted embodiment, a center gasket 422' seals fluid from reaching center inner opening 421 on the lower side of the plate structure to separate the fluid flow paths between the upper and lower sides of the plate structure. Note also that where gaskets are present between plate structures, fluid passing through those fluid transport openings is sealed from the fluid flow field defined by the respective plurality of curving fluid channels on the respective surface of the plate structure. In this manner, by selectively positioning the gaskets about the outer and inner fluid transport openings of the plate structure, different fluids of a multi-fluid stack system are configured within the stack to flow across different sets of curving fluid channels on one or more sides of the plate structures in the stack.

As with the curving fluid channels 430 of FIGS. 4C-4D, many variations on the curving fluid channel 430' design are possible. For instance, the plurality of curving fluid channels 430' can include a plurality of parallel curving fluid channels on the second (e.g., lower) side of the wall structure, which can be the same as or different from the curving fluid channels 430 on the first (e.g., upper) side of the wall structure. In another example, the spacing (or width of raised lands 431') between adjacent curving fluid channels of the plurality of curving fluid channels 430' can vary between the circumferential end and the center end, and/or can vary from the spacing between adjacent curving fluid channels of the plurality of curving fluid channels 430 (FIGS. 4C-4D) on the first side of the plate structure. For instance, spacing can decrease between adjacent fluid channels of the plurality of curving fluid channels on one side of the plate structure, but not the other. In another implementation, the cross-sectional area of one or more curving fluid channels of the plurality of curving fluid channels 430' can vary between the circumferential end and the center end. Many variations are possible to achieve a desired flow field configuration for the different sides of the plate structure, for instance, dependent on the particular flow parameters of the fluid to pass across the respective side.

As illustrated in FIG. 4F, two or more alignment recesses 441 can be provided, in one embodiment, in the second or lower side of the plate structure, to receive respective alignment lands or keys of an adjacent, interfacing structure, such as an adjacent, interfacing plate structure, within the stack to ensure alignment of the appropriate outer and inner fluid transport openings through the plate structures and the surrounding gaskets or seals for forming the required fluid columns within the stack-up.

Advantageously, with a plate structure such as depicted in FIGS. 4A-4H, performance of the resultant stack system is enhanced. For instance, depending on the flow pitch, pressure drop, and angle, drainage across the plate structure is improved, with (for instance) no sharp bends that can result in coolant entrapment. Further, with a plate structure as discussed herein, gravity-enhanced drainage of coolant within the stack system is facilitated. Another advantage of this design is an increase in the active reaction area by increasing cell usage in the vertical z-direction. The areal growth and reaction-capable area is noticeable at higher cell counts and smaller stack system x-y constraints. These values are highly dependent on a number of factors, including port sizing, seal sizing, efficiency of the stack, and other common runtime variables. As noted, assembly of the stack is facilitated using alignment key features to prevent incorrect assembly, making the components of the stack system self-centering, for instance, about a center fastener through the stack. In one or more implementations, the resultant stack configuration is a cylindrical-shaped stack, and is scalable for a particular stack diameter. A variety of manufacturing processes can be used to produce the plate structures including, for instance, casting, stamping/drawing, and injection-molding, as desired. In one or more implementations, the plate structures can be made of a variety of different types of materials, such as metal, coated metal, graphite, carbon composite, carbon-polymer composites, etc. By way of specific example, a conical stack at a diameter of 50 mm with a bipolar plate thickness of 0.5 mm and 500 cells with the conical angle at a 45° angle from the horizon can result in an output advantage over a 2-D planar square stack with two sides being 50 mm and the same cell count and thickness. Alternatively, a conical cell of a size 5 mm with a plate thickness of 0.5 mm and 45° angle incline would see an output advantage over a 2-D planar square stack at a cell count of around 100 cells.

Further, with circular-shaped fluid transport openings, simplified sealing gaskets can be used, such as commercially available O-rings. In addition, the non-planar, three-dimensional plate structures described herein facilitate increasing the effective flow field, and therefore the effective reaction area for a given x, y constraint. In one or more implementations, the angle (or vertical offset distance between the circumferential end and the center end of the plate structures) affects the height or length of the resultant cylindrical-shaped stack. By utilizing the z-axis for the flow field, gravity-assisted drainage is achieved. Further, using partial-helical (or curving) fluid channels in the flow field results in providing uniform parallel flow fields that maximize usage of the active area, without implementing serpentine channels with multiple different bends, as in conventional rectangular-shaped implementations. Additionally, the non-planar, three-dimensional-shaped plate structures disclosed herein can be designed or configured for a particular stack system requirement. In one or more embodiments, a desired pressure drop or flow compensation can be achieved (or controlled) within a parallel flow field by implementing, for instance, channel blockers or an in-line reduction of the flow field channels across the plate structures. Advantageously, in one or more embodiments, power output of the stack system can be increased by utilizing the z-axis for gravity-assisted flow, and the catalytic area as current density increases, and flow and other losses are minimized. The z-axis component of the resultant cell stack (disclosed herein) advantageously allows for system performance optimization beyond current limits of planar cell stacks.

As noted, many variations of plate structures with non-planar, three-dimensional shapes and curving fluid channels, in accordance with one or more aspects disclosed herein, are possible. By way of further example, FIGS. 5A-5D illustrate another implementation of a plate structure 500, in accordance with one or more aspects of the present invention. Unless otherwise indicated, plate structure 500 includes (in one or more embodiments) the features described above in connection with plate structure 400 of FIGS. 4A-4H.

Figure 5A:
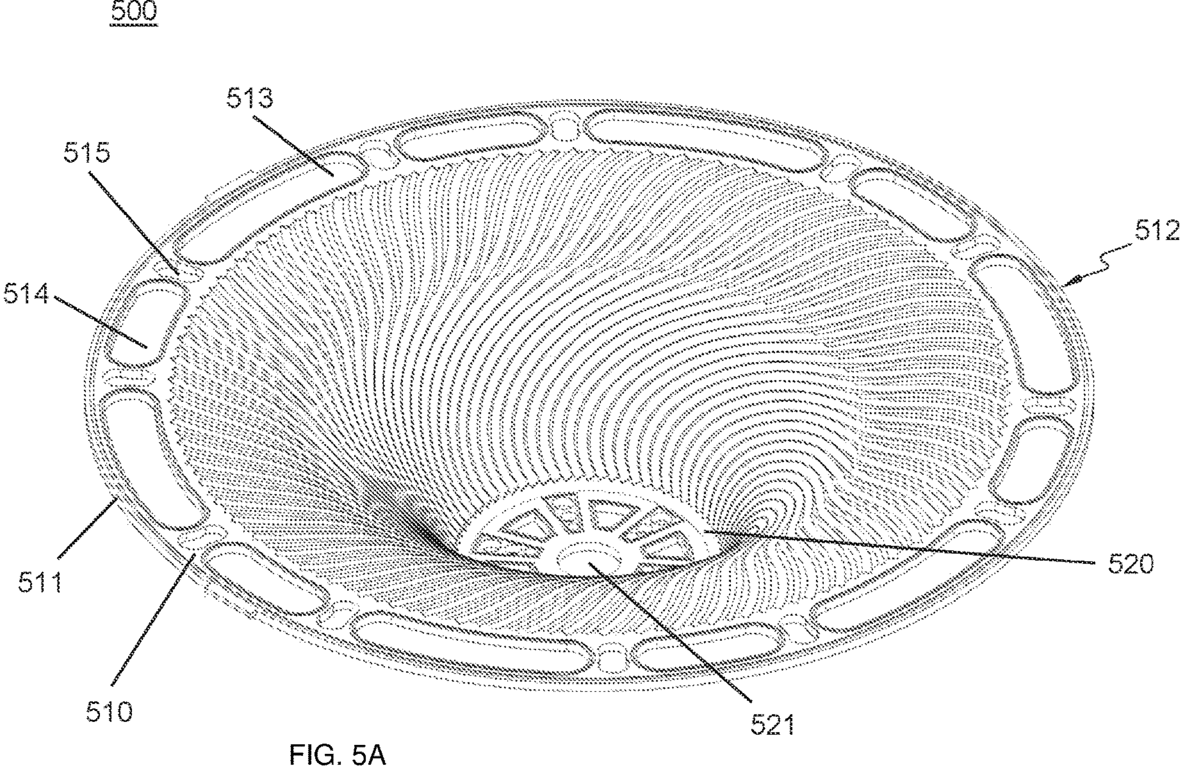
FIGS. 5A-5D depict another embodiment of a plate structure of a stack system, in accordance with one or more aspects of the present invention.
Figure 5B:
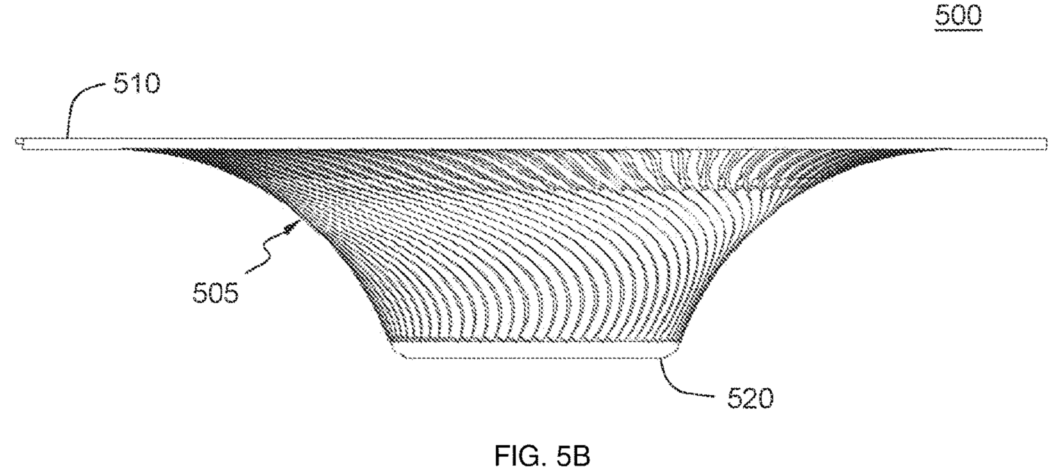

Referring initially to FIGS. 5A-5B, plate structure 500 has, in one embodiment, a non-uniform, curving wall structure 505 extending between and connecting circumferential end 510 and center end 520, such that a curving, trapezoidal-shaped plate structure is provided in side elevational view. In the depicted embodiment, plate structure 500 includes a peripheral seal 511 about the periphery 512 of circumferential end 510 to seal in a fluid (e.g., coolant) passing across the upper surface of plate structure 500 (e.g., between interfacing plate structures). Further, in this embodiment, a center inner opening 521 in center end 520 is provided through which a center stack fastener is to extend, in one or more embodiments of the assembled stack system, such as depicted in FIGS. 6A-6D.

Figure 5C:
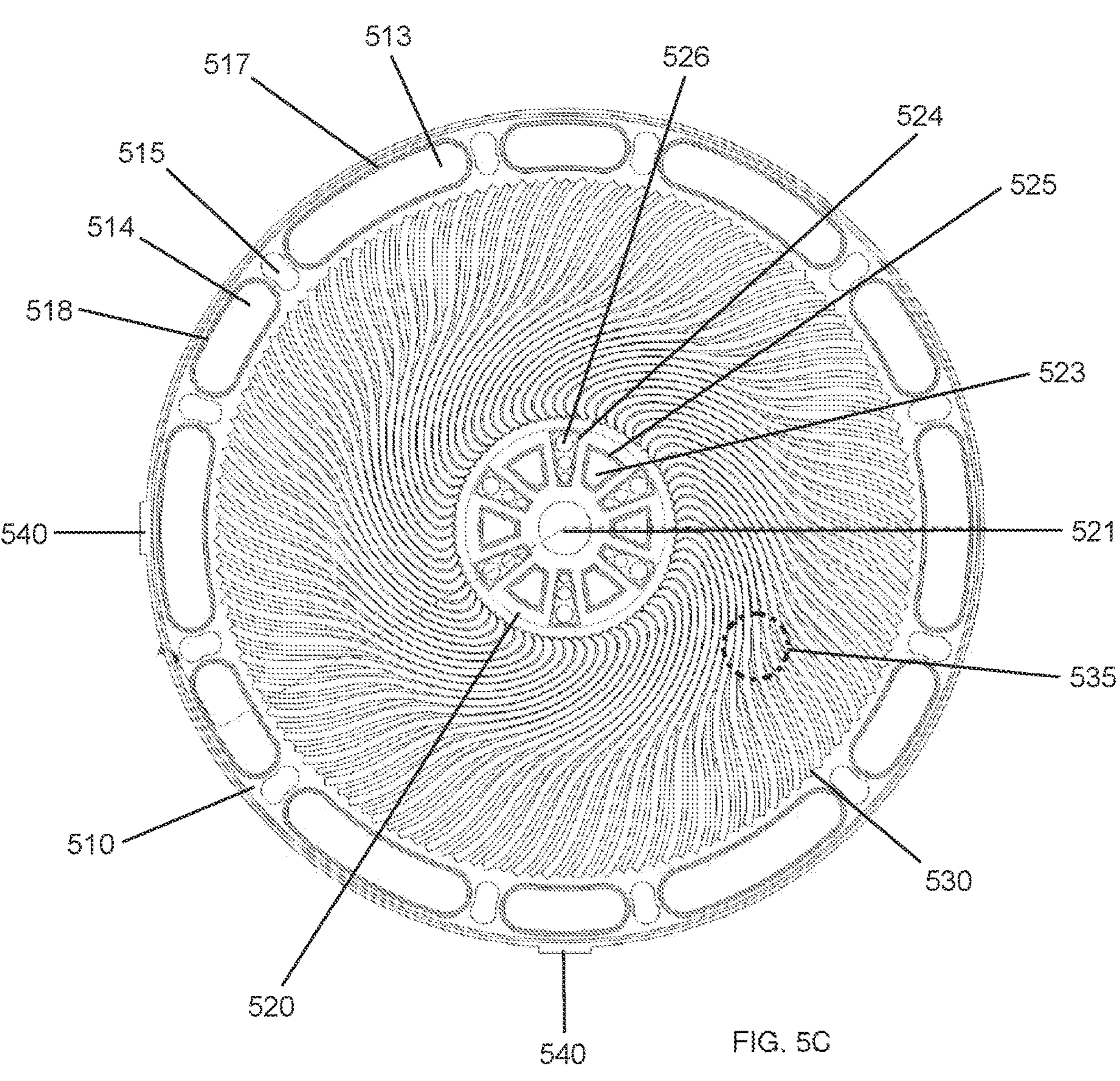
Figure 5D:
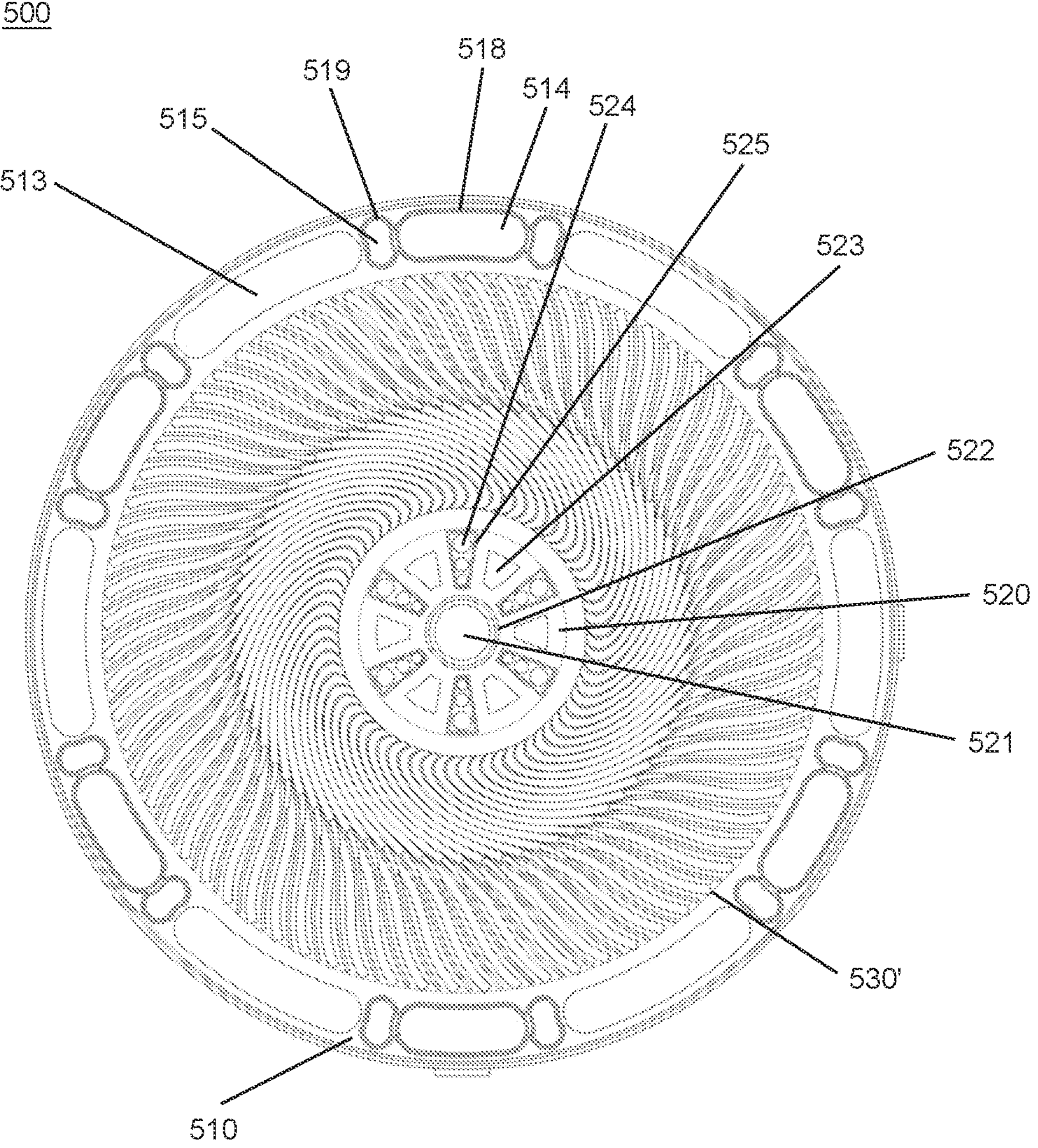

FIG. 5C is a top plan view of plate structure 500 of FIGS. 5A-5B, and FIG. 5D is a bottom plan view of plate structure 500. As illustrated, circumferential end 510 includes multiple outer fluid transport openings 513, 514, 515 through the plate structure, and center end 520 includes multiple inner fluid transport openings 521, 523, 524, through the plate structure. In addition, a plurality of curving fluid channels 530 are provided on a first (e.g., upper) side of wall structure 505 extending between and connecting circumferential end 510 and center end 520. The plurality of curving fluid channels 530 are defined between raised lands on the upper surface of wall structure 505, in one embodiment. Further, in the depicted implementation, two or more adjacent curving fluid channels 530 of the plurality of curving fluid channels on the upper surface of wall structure 505 merge in a region 535 between circumferential end 510 and center end 520, into a single fluid channel. Similarly, as illustrated in FIG. 5D, plate structure 500 can include, in addition to the plurality of curving fluid channels 530 on the upper surface of wall structure 505, another plurality of curving fluid channels 530' on the second (e.g., lower) side of wall structure 505, in one or more embodiments.

Depending on the implementation, the multiple outer fluid transport openings 513, 514, 515 and multiple inner fluid transport openings 521, 523, 524 accommodate passage of multiple different fluids through the stack system. For instance, in one or more implementations, a first set of outer and inner fluid transport openings 513, 523 are isolated within the cell stack to accommodate flow of a first reactant through the cell stack, a second set of outer and inner fluid transport openings 514, 524 are isolated within the stack to accommodate flow of a second reactant, and a third set of outer and inner fluid transport openings 515, 521 are isolated within the cell stack to facilitate the flow coolant through the cell stack, by way of example. For example, in FIGS. 5A & 5C, outer fluid transport openings 513, 514 and inner fluid transport openings 523, 524 include gaskets 517, 518, 525, 526, respectively, around the openings to seal off fluid passing through those openings from the plurality of curving fluid channels 530, illustrated on the one side of the wall structure 505. Further, as illustrated, the different fluid transport openings can be differently sized and configured. For instance, outer and inner fluid transport openings 513, 523 can be sized to accommodate a first reactant flow, such as oxygen flow, outer and inner fluid transport openings 514, 524 can be sized and configured to accommodate a second reactant flow, such as hydrogen flow, and openings 515, 521 can be sized and configured to accommodate flow of a coolant flow (e.g., water), by way of example only. In the example embodiment of FIGS. 5A & 5C, fluid flows between outer fluid transport openings 515 and inner fluid transport opening 521 through the plurality of coolant flow channels 530. Appropriate gaskets 517, 518, 525, 526 seal the remaining outer and inner fluid transport openings from the fluid on the upper side of plate structure 500.

FIG. 5D depicts one embodiment of the second side of plate structure 500 of FIGS. 5A-5B. In the embodiment illustrated, the second side includes, in addition to circumferential end 510 and center end 520, another plurality of curving fluid channels 530' on the wall structure extending between the circumferential end and center end. Again, the second side representation of FIG. 5D depicts one embodiment only of a plate structure such as disclosed herein. The illustrated plate structure configuration can beneficially be used with a first fluid passing across the first side of the plate structure through the first set of curving channels 530, and a second fluid passing across the second side of the plate structure through the second set of curving fluid channels 530'. As noted with respect to FIGS. 4A-4H, where there are first and second sets of curving fluid channels on the different sides of the plate structure, the curving fluid channels can be differently configured on the different sides, dependent for instance, on the respective fluid flow. For example, in one implementation, the first set of curving fluid channels 530 on the first side of the plate structure can be configured to accommodate a coolant flow, and the second set of curving fluid channels on the second side of the plate structure can be configured to accommodate a reactant flow, such as hydrogen or oxygen, depending on the location of the plate structure within the stack system, and the type of stack system. In the example of FIG. 5D, fluid (such as a reactant fluid or a coolant) can flow between outer and inner fluid transport openings 513, 523 without gaskets, with the remaining outer and inner fluid transport openings being sealed by respective gaskets, including gaskets 519 about outer fluid transport openings 515 and a gasket 522 about center opening 521. As noted with respect to FIGS. 4A-4H, the flow fields on the different sides of plate structure 500 can also be varied by varying the wall structure configuration, in addition to varying the curving fluid channel configurations on the different sides.

As briefly noted above, disclosed herein are new types of stack systems with, for instance, enhanced fastener configurations and enhanced flow of fluid through the cell stacks of the stack systems. In one or more embodiments, these further enhancements can be implemented separately or in combination with a cell stack having plate structures/assemblies (i.e., flow field plates) that have a non-planar, three-dimensional shape such as described herein.

In one or more aspects, stack systems, including fuel cell stack systems and electrolyzer stack systems, are disclosed herein which include a first end plate and a second end plate, as well as a compression plate. Multiple cells and associated plate structures are arranged in a cell stack, and a center fastener passes through a central opening in the cell stack and connects the first and second end plates together with the compression plate and the cell stack disposed between the first and second end plates. The center fastener applies a compressive force on the cell stack through, in part, the compression plate. Multiple adjustable compression screws extend from the first end plate about the center faster to apply one or more respective variable forces on the cell stack through the compression plate in addition to the compressive force on the cell stack applied by the center fastener. In this manner, applied compression on the cell stack can be variably adjusted, as desired for a particular implementation.

In one or more embodiments, the center fastener axially applies the compressive force on the cell stack through the compression plate, and creates a seal between the multiple cells and the associated plate structures arranged in the cell stack. In one or more embodiments, the center fastener includes an at least partially threaded shaft and a compression nut. The at least partially threaded shaft is secured to the second end plate, and the compression nut threadably engages the at least partially threaded shaft of the center fastener, and is disposed in contact with the first end plate to rotatably, axially apply the compressive force on the cell stack through the first end plate and the compression plate. In one embodiment, there is a seal about the center fastener between the compression plate and the compression nut.

In one or more embodiments, the multiple adjustable compression screws are spaced radially from, and positioned about the center fastener. In one embodiment, at least one of the center fastener and the central opening through the cell stack is configured for a fluid to pass through the central opening in the cell stack to facilitate flow of the fluid within the stack system. For instance, in one embodiment, the central opening can be configured for the fluid to pass along (such as around) the center fastener. In another embodiment, the center fastener includes an outer notch extending lengthwise along the center fastener within the cell stack to allow the fluid to pass within the outer notch along the center fastener, through the central opening in the stack system.

In one or more embodiments, a plate structure of the multiple cells and associated plate structures has a non-planar, three-dimensional shape, such as described herein. For instance, in one embodiment, the plate structure includes a circumferential end and a center end, where the circumferential end is vertically offset from the center end. A wall structure extends between and connects the circumferential end and the center end. A plurality of curving fluid channels are disposed on at least one side of the wall structure extending between the circumferential end and the center end. The circumferential end includes multiple outer fluid transport openings through the plate structure, and the center end includes multiple inner fluid transport openings through the plate structure. One or more outer fluid transport openings of the multiple outer fluid transport openings and one or more inner fluid transport openings of the multiple inner fluid transport openings facilitate, at least in part, flow of a fluid across the plate structure between the circumferential end and the center end, through the plurality of curving fluid channels.

In one or more embodiments, the wall structure curves between the circumferential end and the center end. In one embodiment, the plurality of curving fluid channels include a first set of curving fluid channels on one side of the wall structure extending between the circumferential end and the center end, and a second set of curving fluid channels on another side of the wall structure extending between the circumferential end and the center end. In one embodiment, the first set of curving fluid channels on the one side of the wall structure are differently configured from the second set of curving fluid channels on the other side of the wall structure.

In one or more embodiments, the second end plate is a base plate with one or more inner fluid transport openings coupling in fluid communication one or more outer fluid transport openings of the multiple outer fluid transport openings and one or more inner fluid transport openings of the multiple inner fluid transport openings.

In one or more other aspects, a stack system is disclosed herein which includes multiple cells and associated plate structures arranged in a cell stack, with a plate structure of the multiple cells and associated plate structures having a non-planar, three-dimensional shape with a circumferential end and a center end, where the circumferential end is vertically offset from the center end. Further, the stack system includes a first end plate and a second end plate, with the cell stack being disposed between the first and second end plates. At least one of the first end plate and the second end plate has a non-planar, three-dimensional surface coupled to the cell stack, sized and configured to receive the plate structure having the non-planar, three-dimensional shape.

In another aspect, a stack system is disclosed which includes a first end plate and a second end plate, and a cell stack disposed between the first and second end plates. The cell stack includes multiple cells and associated plate structures arranged in the cell stack, and multiple outer fluid transport openings through the cell stack and multiple inner fluid transport openings through the cell stack. The second end plate further includes multiple fluid redirect channels. The multiple fluid redirect channels connect in fluid communication selected outer and inner fluid transport openings of the multiple outer and inner fluid transport openings to redirect fluid passing through the cell stack back through the cell stack. In this manner, multiple fluid inlets and outlets for the stack system can be provided in the first end plate (e.g., upper end plate). For instance, in operation, multiple fluids can be supplied via multiple inlet ports in the first end plate to pass through the cell stack, where the multiple fluid redirect channels facilitate, at least in part, redirecting the multiple fluids passing through the cell stack back through the cell stack for exhausting through multiple outlet ports in the first end plate.

In one or more embodiments, the multiple outer fluid transport openings through the cell stack include a first set of one or more outer fluid transport openings facilitating flow of a first fluid through the cell stack, a second set of one or more outer fluid transport openings facilitating flow of a second fluid through the cell stack, and a third set of one or more outer fluid transport openings facilitating flow of a third fluid through the cell stack. The multiple inner fluid transport openings through the cell stack include a first set of one or more inner fluid transport openings facilitating flow of the first fluid through the cell stack, a second set of one or more inner fluid transport openings facilitating flow of the second fluid through the cell stack, and a third set of one or more inner fluid transport openings facilitating flow of the third fluid through the cell stack. Further, the multiple fluid redirect channels of the second end plate include at least one first redirect channel, at least one second redirect channel, and at least one third redirect channel. The at least one first redirect channel couples in fluid communication the first set of one or more outer fluid transport openings and the first set of one or more inner fluid transport openings, the at least one second redirect channel couples in fluid communication the second set of one or more outer fluid transport openings and the second set of one or more inner fluid transport openings, and the at least one third redirect channel couples in fluid communication the third set of one or more outer fluid transport openings and the third set of one or more inner fluid transport openings to facilitate flow of the first fluid, second fluid and third fluid through the cell stack.

In one embodiment, the first fluid is a first reactant, and the at least one first redirect channel facilitates, at least in part, return of the first reactant through the cell stack to a first reactant outlet in the first end plate, and the second fluid is a second reactant, and the at least one second redirect channel facilitates, at least in part, return of the second reactant through the cell stack to a second reactant outlet in the first end plate, and the third fluid is a coolant, and the at least one third redirect channel facilitates, at least in part, return of the coolant through the cell stack to a coolant outlet in the first end plate.

In one or more embodiments, a plate structure of the multiple cells and associated plate structures has a non-planar, three-dimensional shape. In one embodiment, the plate structure includes a circumferential end and a center end, where the circumferential end is vertically offset from the center end. A wall structure extends between and connects the circumferential end and the center end. A plurality of curving fluid channels on at least one side of the wall structure extend between the circumferential end and the center end. The multiple outer fluid transport openings pass through the circumferential end of the plate structure, and the multiple inner fluid transport openings pass through the center end of the plate structure. One or more outer fluid transport openings of the multiple outer fluid transport openings and one or more inner fluid transport openings of the multiple inner fluid transport openings facilitate, at least in part, flow of fluid across the plate structure between the circumferential end and the center end, through the plurality of curving fluid channels.

In a further aspect, a stack system is provided which includes a first end plate, a second end plate, and a compression plate. Multiple cells and associated plate structures are arranged in a cell stack, with the cell stack including multiple transport openings through the cell stack. A center fastener passes through a central opening in the cell stack and connects the first and second end plates together, with the compression plate and the cell stack disposed between the first and second end plates. The center fastener applies a compressive force on the cell stack through the compression plate, and the second end plate includes multiple fluid redirect channels. The multiple fluid redirect channels connect in fluid communication selected fluid transport openings of the multiple fluid transport openings through the cell stack to redirect fluid passing through the cell stack back through the cell stack. In one embodiment, the center fastener is configured to axially apply the compressive force on the cell stack between the first end plate and the second end plate, through the compression plate, to create a seal between the multiple cells and the associated plate structures arranged in the cell stack.

In one or more embodiments, the center fastener has an at least partially threaded shaft and a compression nut. The at least partially threaded shaft is secured to the second end plate, and the compression nut threadably engages the at least partially threaded shaft of the center fastener, and is disposed to contact the first end plate to axially apply the compressive force on the cell stack through the first end plate and the compression plate.

In one or more embodiments, the multiple fluid transport openings include multiple outer fluid transport openings through the cell stack and multiple inner fluid transport openings through the cell stack. The multiple outer fluid transport openings through the cell stack include a first set of one or more outer fluid transport openings facilitating flow of a first fluid through the cell stack, a second set of one or more outer fluid transport openings facilitating flow of a second fluid through cell stack, and a third set of one or more outer fluid transport openings facilitating flow of a third fluid through the cell stack. The multiple inner fluid transport openings through the cell stack include a first set of one or more inner fluid transport openings facilitating flow of the first fluid through the cell stack, a second set of one or more inner fluid transport openings facilitating flow of the second fluid through the cell stack, and a third set of one or more inner fluid transport openings facilitating flow of the third fluid through the cell stack. The multiple fluid redirect channels of the end plate include at least one first redirect channel, at least one second redirect channel, and at least one third redirect channel. The at least one first redirect channel couples in fluid communication the first set of one or more outer fluid transport openings and the second set of one or more inner fluid transport openings, and the at least one second redirect channel couples in fluid communication the second set of one or more outer fluid transport and the second set of one or more inner fluid transport openings, and the at least one third redirect channel couples in fluid communication the third set of one or more outer fluid transport openings and the third set of one or more inner fluid transport openings to facilitate flow of the first fluid, the second fluid and the third fluid through the cell stack.

In one or more embodiments, the first fluid is a first reactant, and the at least one first redirect channel facilitates, at least in part, return of the first reactant through the cell stack to a first reactant outlet in the first end plate, the second fluid is a second reactant, and the at least one second redirect channel facilitates, at least in part, return of the second reactant through the cell stack to a second reactant outlet in the first end plate, and the third fluid is a coolant, and the at least one third redirect channel facilitates, at least in part, return of the coolant through the cell stack to a coolant outlet in the first end plate.

In one or more embodiments, a plate structure of the multiple cells and associated plate structures has a non-planar, three-dimensional shape. In one embodiment, the plate structure includes a circumferential end and a center end, where the circumferential end is vertically offset from the center end. A wall structure extends between and connects the circumferential end and the center end. A plurality of curving fluid channels are disposed on at least one side of the wall structure extending between the circumferential end and the center end. The multiple fluid transport openings include multiple outer fluid transport openings and multiple inner fluid transport openings, with the multiple outer fluid transport openings passing through the circumferential end of the plate structure, and the multiple inner fluid transport openings passing through the center end of the plate structure. One or more outer fluid transport openings of the multiple outer fluid transport openings and one or more inner fluid transport openings of the multiple inner fluid transport openings facilitate, at least in part, flow of a fluid across the plate structure between the circumferential end and the center end, through the plurality of curving fluid channels.

Those skilled in the art will note that numerous inventive aspects or features are disclosed herein, and unless inconsistent, each disclosed aspect or feature is combinable with any other disclosed aspect or feature as desired for a particular application of the concepts disclosed. In one embodiment, the stack system is a fuel cell stack system with the cell stack formed by multiple cells with associated plate structures. Multiple plate structures of the cell stack are configured with a non-planar, three-dimensional shape. For instance, in one embodiment, the non-planar, three-dimensional plate structures have a circumferential end and a center end, where the circumferential end is vertically offset from the center end such that the plate structure extends in a z axis direction. In one embodiment, the plate structure is circular-shaped in plan view. In one or more embodiments, the plate structures are compressed together by a center fastener connecting, for instance, two end plates of the stack system. Multiple adjustable compression screws, or peripheral fasteners, are also provided to apply respective variable forces on the cell stack through, for instance, a compression plate, where the respective variable forces are in addition to the compression force on the cell stack applied by the center fastener. Further, in one or more embodiments, one or more of the end plates of the stack system can be configured with a non-planar surface which interfaces with the cell stack to facilitate accommodating the non-planar, three-dimensional-shaped plate structures of the cell stack. In addition, one or more of the end plates in the stack system can include multiple fluid redirect channels internal to the end plate connecting in fluid communication selected outer and inner fluid transport openings through the cell stack to redirect fluid passing through the cell stack back through the cell stack to, for instance, recirculate the fluids within the cell stack, or to facilitate egress of the fluids from, for instance, fluid outlets disposed in an upper end plate of the stack system. In one or more other embodiments, one or more fluid redirect channels within the second end plate can include a chamber or reservoir to facilitate collection and flow of a respective fluid through the cell stack.

Figure 6A:
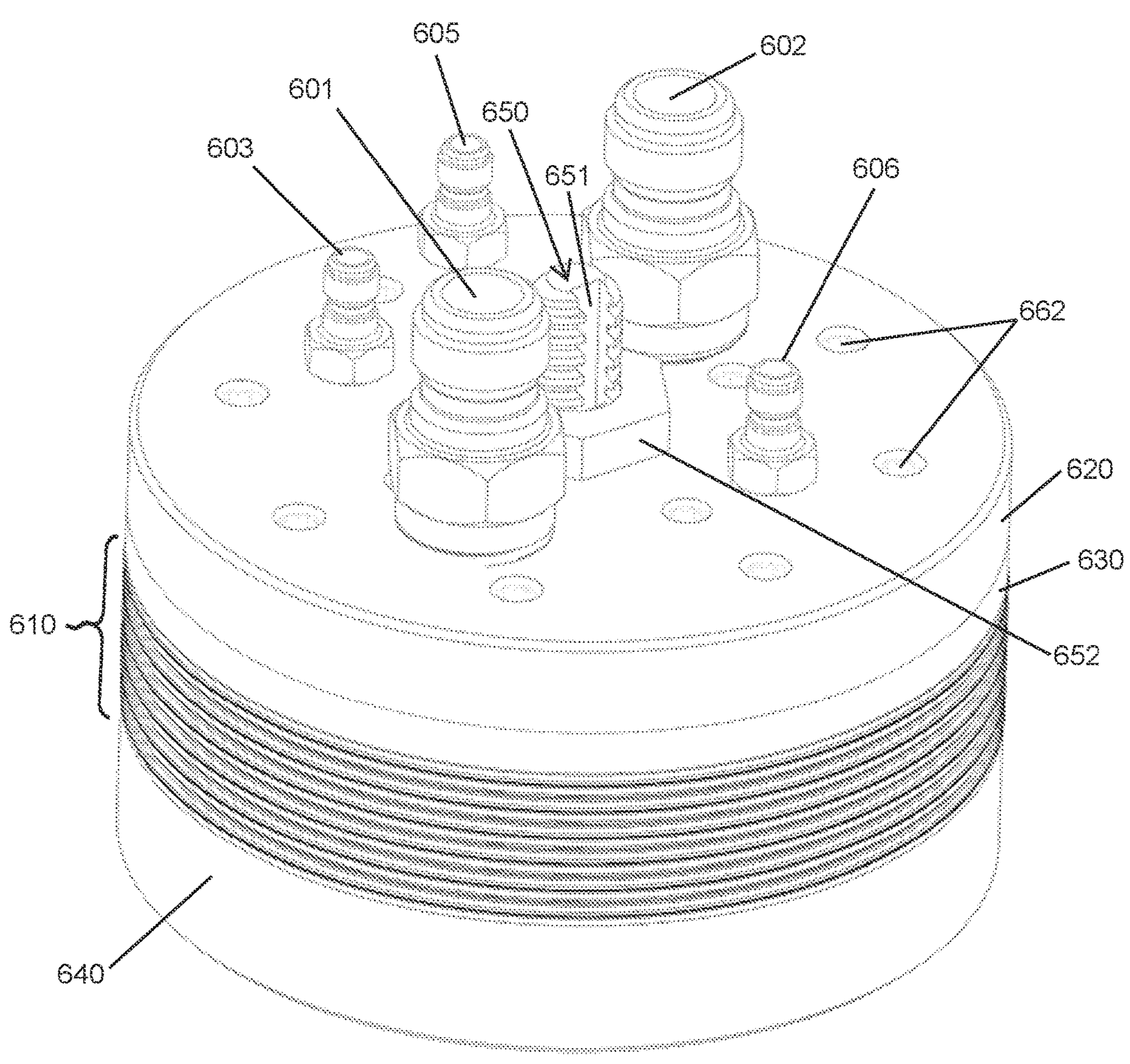
FIGS. 6A-6D depict one embodiment of a stack system, in accordance with one or more aspects of the present invention.
Figure 6B:
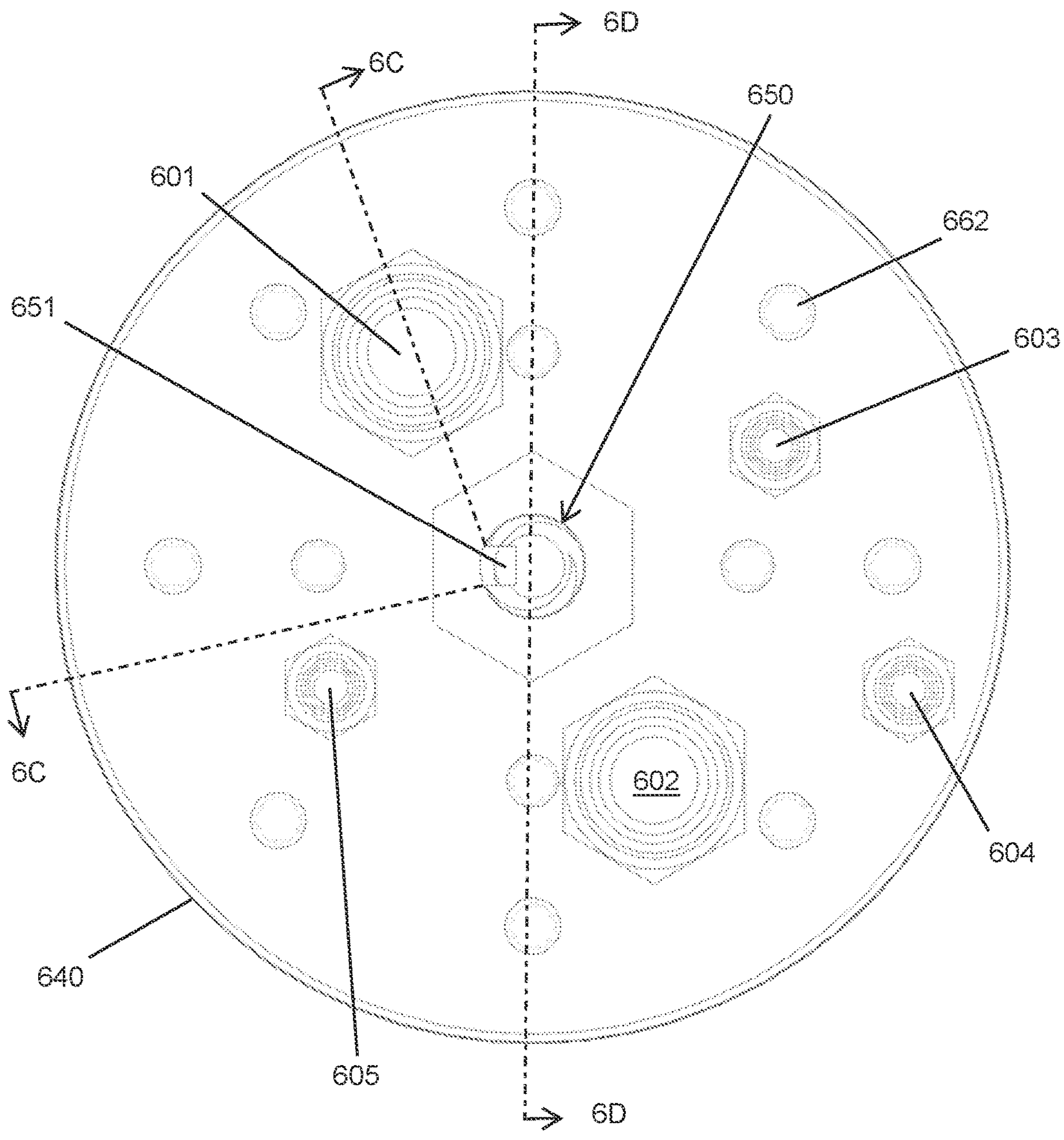
Figure 6C:
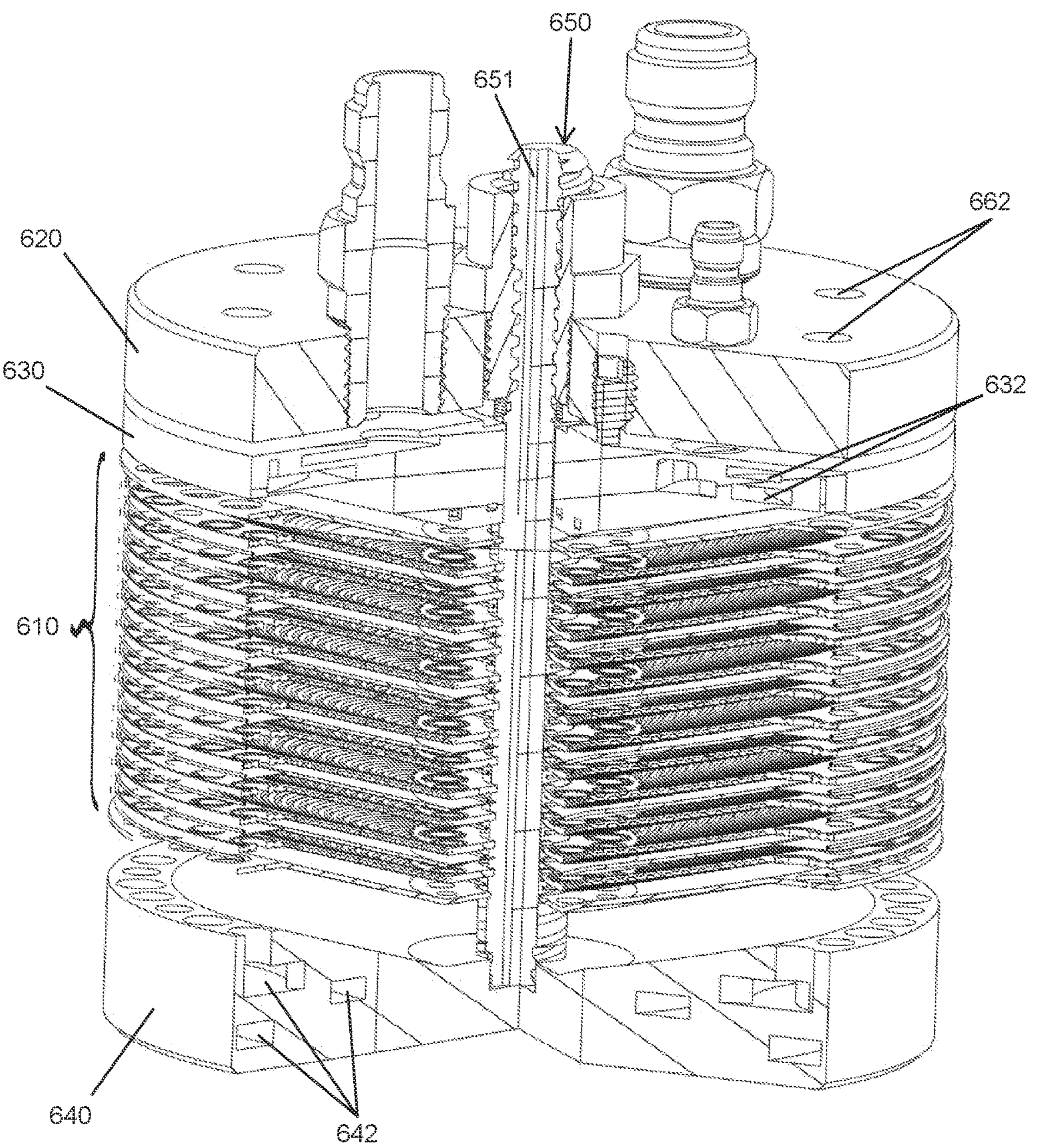
Figure 6D:
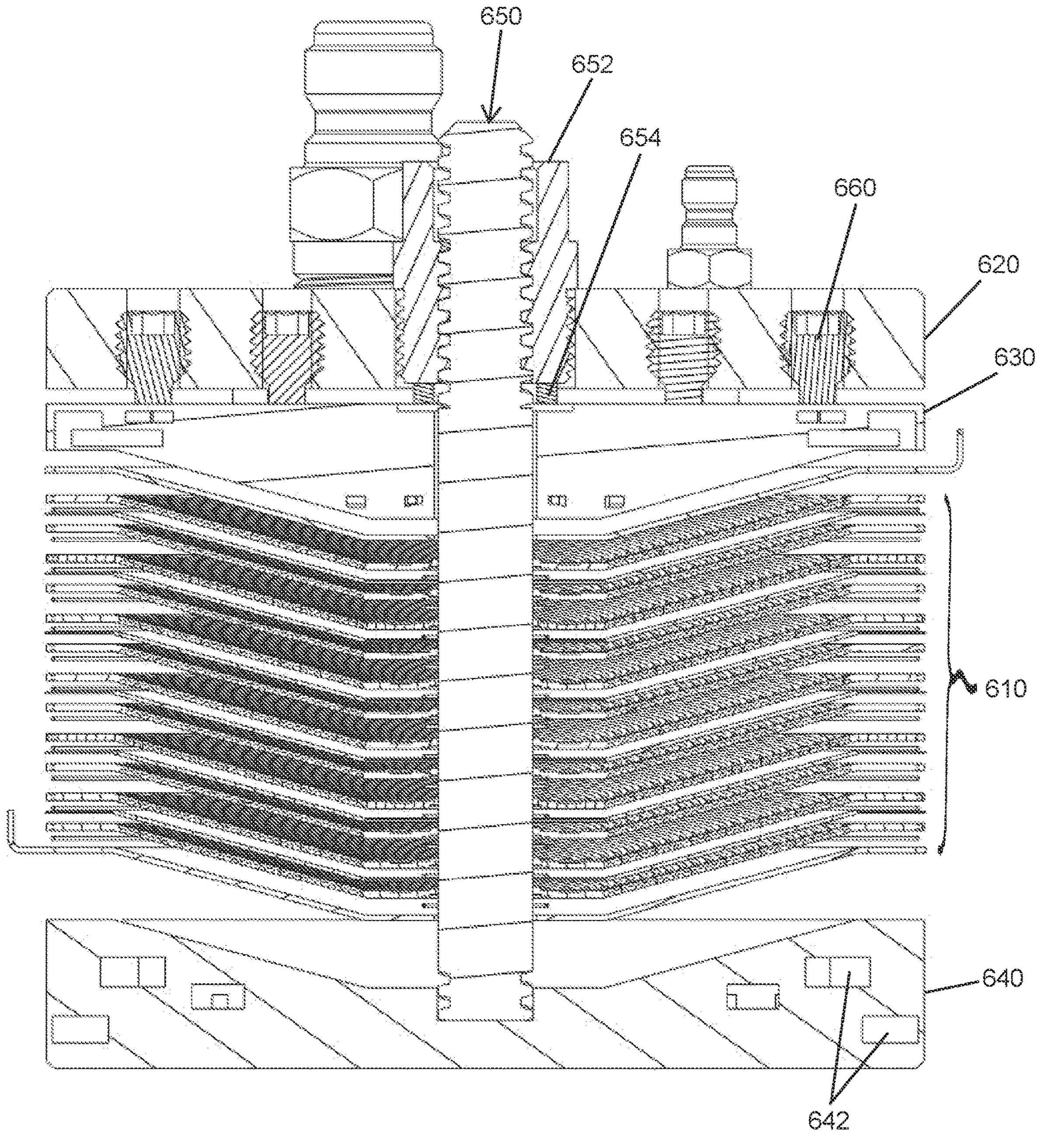

By way of example, FIGS. 6A-6D depict one embodiment of a stack system 600, in accordance with one or more aspects of the present invention. In particular, FIG. 6A is an isometric view of stack system 600, FIG. 6B is a top plan view of stack system 600, and FIGS. 6C & 6D are partially exploded, cross-sectional views of stack system 600 of FIGS. 6A-6B, taken along lines 6C-6C and 6D-6D, respectively, in FIG. 6B.

Referring collectively to FIGS. 6A-6D, in the embodiment depicted, stack system 600 is a cylindrical-shaped stack system, such as a cylindrical-shaped fuel cell stack system. Stack system 600 includes multiple cells and associated plate structures arranged in a cell stack 610 disposed between a first end plate 620 (or upper end plate) and a second end plate 640 (or base plate). As noted, in one or more embodiments, cell stack 610 includes multiple cells and associated plate structures arranged in the cell stack, with one or more of the plate structures having a non-planar, three-dimensional shape. In one embodiment, each of the plate structures has a similar non-planar, three-dimensional shape, such as described herein with reference to the examples of FIGS. 4A-5D. Further, in the embodiment depicted, a separate compression plate 630 is positioned between first end plate 620 and cell stack 610, by way of example only. In one or more embodiments, first end plate 620 and compression plate 630 together make up a distribution compression end plate, and second end plates 640 (i.e., the base plate) can, in one or more embodiments, be a recirculation compression end plate. In one or more embodiments, based on the unique cell stack configuration (that is, a cell stack formed with plate structures having a similar non-planar, three-dimensional shape such as described), one or more of the first and second end plates and the compression plate are configured to accommodate the unique shape of the stack structure. For instance, in the example of FIGS. 6A-6D, compression plate 630 and second end plate 640 are respectively configured with an interfacing surface to the cell stack that accommodates the unique configuration of the cell stack 610.

As illustrated in FIGS. 6A-6D, a center fastener 650 passes through a central opening in the cell stack and connects the first and second end plates 620, 640 together with compression plate 630 and cell stack 610 disposed between first and second end plates 620, 640. The center fastener 650 is configured and sized to apply a compressive force on cell stack 610 between compression plate 630 and second end plate 640, in one or more embodiments.

As illustrated in FIG. 6D, multiple adjustable compression screws 660 reside in respective openings 662 in first end plate 620. In one embodiment, the multiple adjustable compression screws 660 extend from first end plate 620 about center fastener 650 to selectively contact an upper surface of compression plate 630 for applying one or more additional forces on cell stack 610 through compression plate 630, in addition to the compressive force on cell stack 610 through compression plate 630 applied by center fastener 650. In one or more embodiments, adjustable compression screws 660 are separately adjustable and provide a respective leveling force and/or fine adjustment compressive force to cell stack 610 within stack system 600. In one or more embodiments, adjustable compression screws 660 are threaded screws which threadably engage, and can be adjusted to extend from, first end plate 620 to contact compression plate 630 and apply a further leveling force and/or further fine adjustment compressive force on cell stack 610, as desired for a particular application.

As noted, in one embodiment, center fastener 650 is adjustable to axially apply a compressive force on cell stack 610 through compression plate 630 (between compression plate 630 and second end plate 640), to create a fluid-tight seal between the multiple cells and associated plate structures arranged in the cell stack 610. In the depicted embodiment, center fastener 650 includes an at least partially threaded shaft and a compression nut 652. The at least partially threaded shaft is secured to second end plate 640, for instance, threadably secured, adhesively secured, braised, soldered or welded, depending upon the implementation. Compression nut 652 threadably engages the at least partially threaded shaft of center fastener 650 and is disposed in contact with first end plate 620 to axially apply the compressive force on cell stack 610 through first end plate 620 and compression plate 630. In the depicted embodiment, compression nut 652 threadably engages internal threads in first end plate 620, as well as outer threads of the partially threaded shaft of center fastener 650. In one embodiment, an elastomeric seal 654 is disposed between compression nut 652 and compression plate 630 to provide a fluid seal for fluid passing along center fastener 650. For instance, in one or more embodiments, an outer notch 651 (see FIGS. 6A-6C) is provided to axially extend along the partially threaded shaft to facilitate flow of a fluid through the center opening in cell stack 610 of stack system 600, such as described herein.

As depicted, for instance in the FIG. 6D cross-section, the plate structures (as well as the elastomeric seals and proton exchange membranes in the case of a proton exchange membrane fuel cell) have a non-planar, three-dimensional shape in the cell stack, such as described above in connection with the plate structures of FIGS. 4A-5D. In addition, to accommodate the non-planar, three-dimensional shape of the individual plates of cell stack 610, compression plate 630 and second end plate 640 are each configured with a mating surface contacting cell stack 610 that is similarly a non-planar, three-dimensional-shaped surface with, in one embodiment, the mating surface of compression structure 630 being a convex surface, and the mating surface of second end plate 640 being a concave surface. Note that these surface configurations can be reversed in the case where the center end of the plate structures is vertically above the circumferential end, in an alternate embodiment of the stack system.

As illustrated in FIGS. 6A-6D, in one embodiment, the fluid inlets and fluid outlets pass through (for instance, are threaded sealed to) first end plate 620. In this embodiment, second end plate 640, that is, the base plate, does not include any fluid inlets or outlets, which can facilitate placement of the cell stack in a variety of locations where, for instance, only the upper surface of the cell stack is readily accessible.

By way of example, in the case of a fuel cell stack system, the inlet and outlet ports can include an oxygen inlet port 601, an oxygen outlet port 602, a hydrogen inlet port 603, a hydrogen outlet port 604, a coolant inlet port 605, and a coolant outlet port (not shown) through, for instance, outer notch 651 in center fastener 650. To facilitate the single surface grouping of fluid inlets and outlets, first end plate 620 and/or compression plate 630 includes respective fluid distribution channels 632 to distribute the fluid to the desired fluid transport openings in the cell stack 610, and second end plate 640 includes respective coolant redirect channels 642 (or recirculation channels) which allow fluid passing through cell stack 610 to be redirected within second end plate 640 to pass back up through the cell stack, such as back through the flow fields of the cell stack, and/or back through dedicated fluid return columns of the stack system. An example of this is depicted in FIGS. 7A-7B.

Figure 7A:
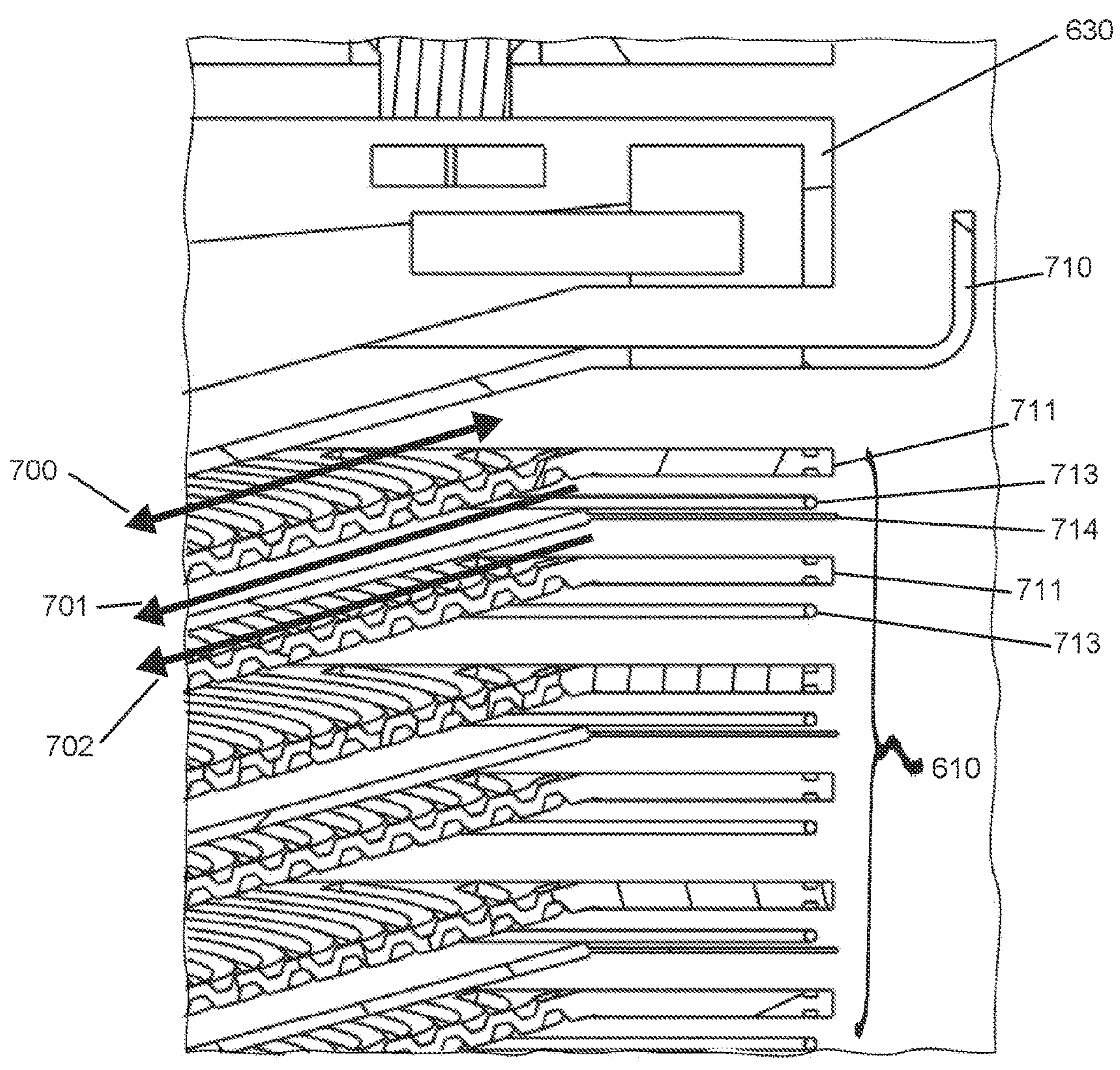
FIGS. 7A-7B schematically illustrate one embodiment of fluid flow through the stack system of FIGS. 6A-6D, in accordance with one or more aspects of the present invention.

Referring to FIG. 7A, a partially exploded schematic views of one embodiment of stack system 600 of FIGS. 6A-6D is illustrated, including a partial depiction of cell stack 610 and compression plate 630. In the embodiment illustrated, cell stack 610 includes alternating plate structures 711, such as plate structures/assemblies 400 & 500 described above in connection with FIGS. 4A-5D. In addition, cell stack 610 includes respective layers of elastomeric seals 713 and membrane electrode assemblies 714 (in one embodiment), such as described above in connection with FIG. 2. By way of example only, in the case where stack system 600 is a fuel cell stack system, a coolant 700 can flow across one side of a plate structure 711, and a reactant, such as oxygen or hydrogen 701 can flow across the other side of plate structure 711, such as described above in connection with the plate structures of FIGS. 4A-5D. Additionally, a second reactant 702, such as hydrogen or oxygen, can flow across a surface of an adjacent plate structure 711 in the cell stack. In one embodiment, the plate structures are flow-field polar plate cathode or anode structures of cell stack 610.

Figure 7B:
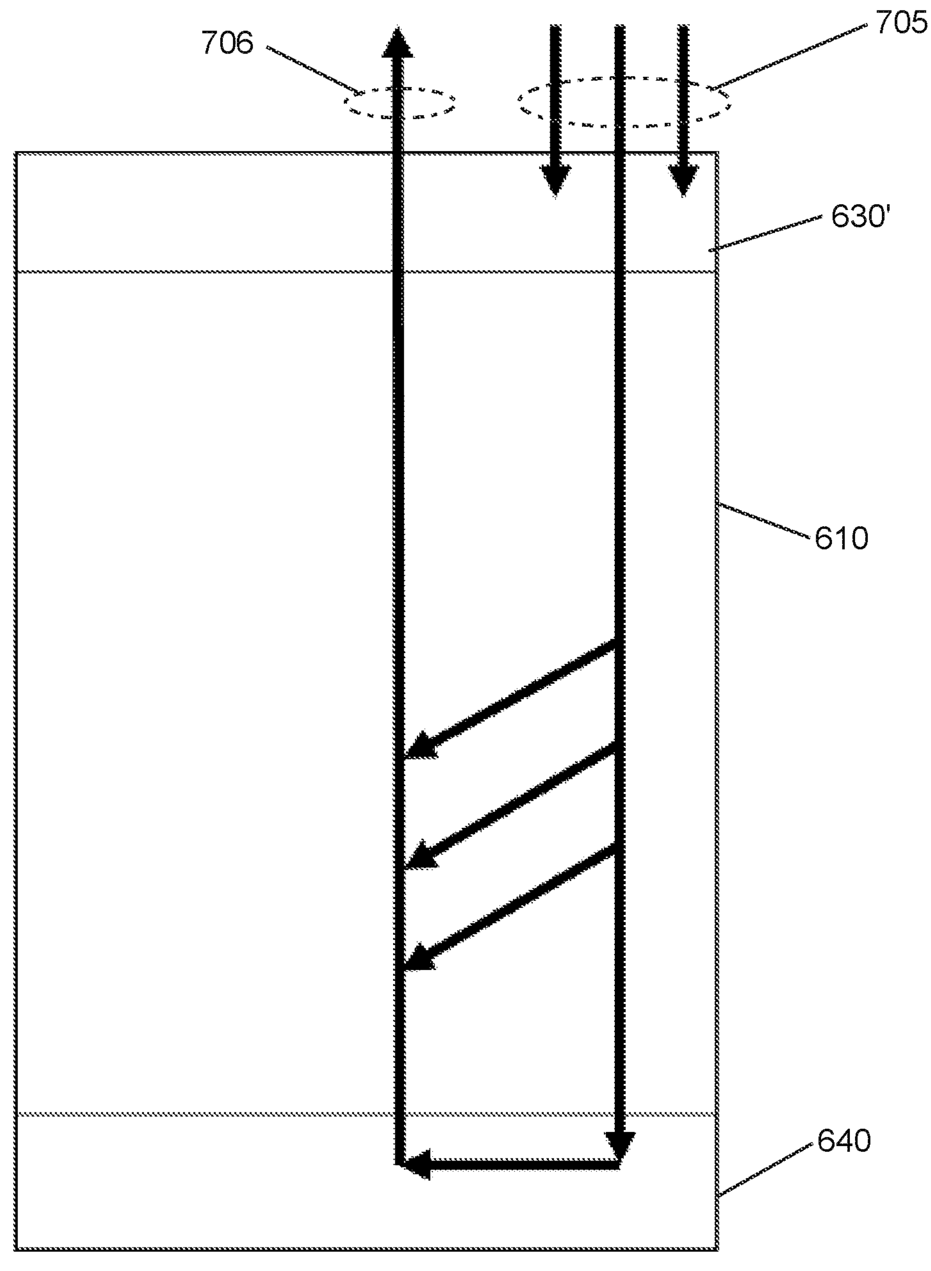

In FIG. 7B, the direction of a fluid flow is schematically illustrated, as one example only. In the example of FIG. 7B, fluid enters and egresses via fluid inlets 705 and fluid outlets 706, respectively, and is provided to the respective cells of the cell stack through, for instance, the first (or upper) end plate and compression plate, which together form a distribution compression end plate 630' in the schematic. In the illustrated example, after passing through cell stack 610 fluid is redirected or recirculated via multiple fluid redirect channels in second end plate 620 to pass back through cell stack 610 and output via the respective fluid outlets 706.

As noted with respect to FIGS. 6A-6D, in one or more embodiments, compression plate 630 includes respective redistribution channels 632 to facilitate flow of fluid from the fluid inlets through cell stack 610. In addition, fluid passing through cell stack 610 is redirected or recirculated via respective fluid redirect channels 642 of second end plate 640 for passage back through cell stack 610, and ultimately through compression plate 630 for egressing from respective outlet ports of the stack system. Note that depending on the implementation, fluid distribution channels 632 and/or fluid redirect channels 642 can each be differently sized, configured, and located as desired to facilitate flow of the respective fluids through the particular stack system at issue. By way of example, FIG. 8E illustrates one embodiment of a flow of fluids through a compression plate of a fuel cell stack system implementation.

Figure 8A:
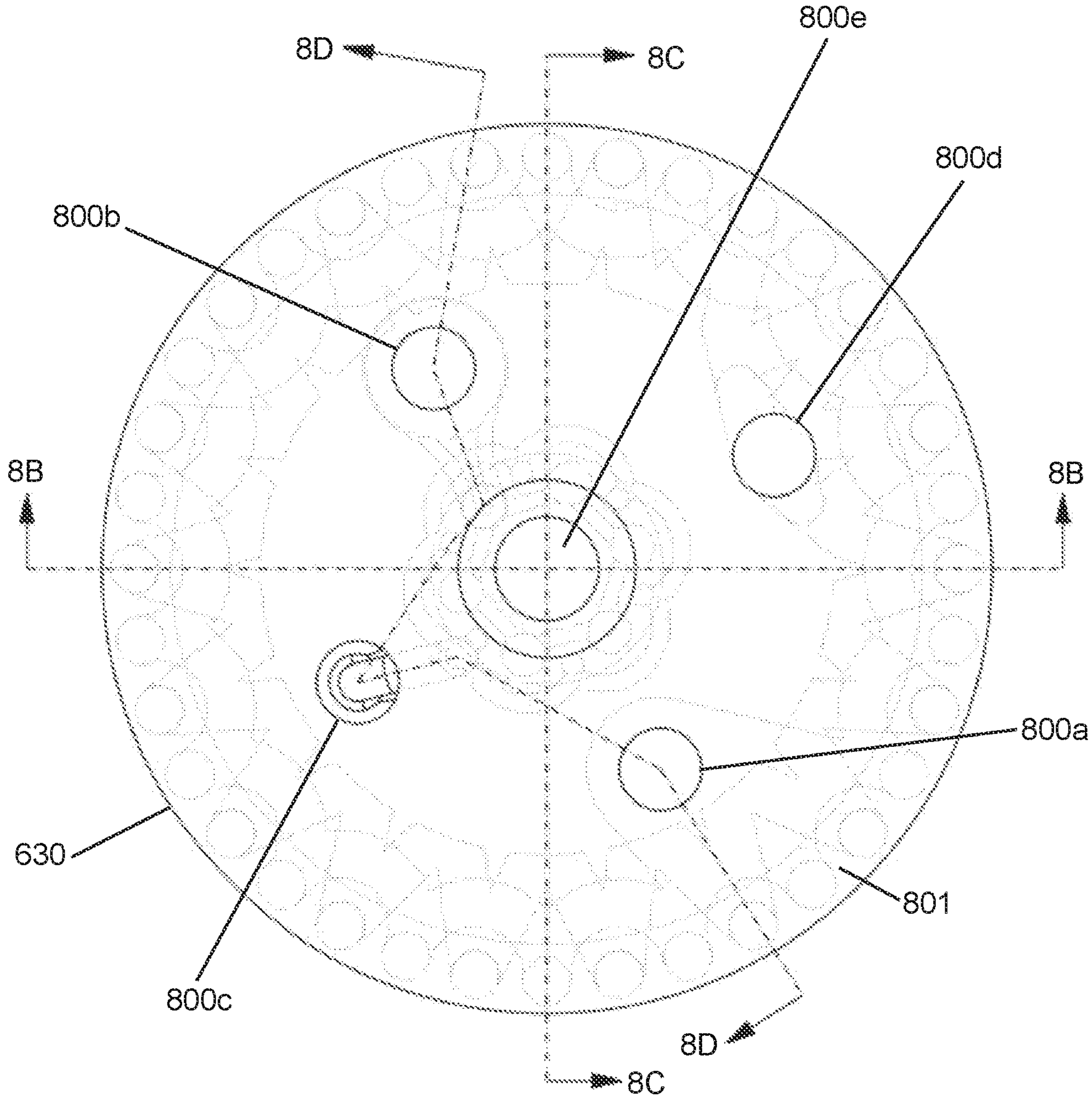
FIGS. 8A-8E depict one embodiment of a compression plate of the stack system of FIGS. 6A-6D, in accordance with one or more aspects of the present invention.
Figure 8B:
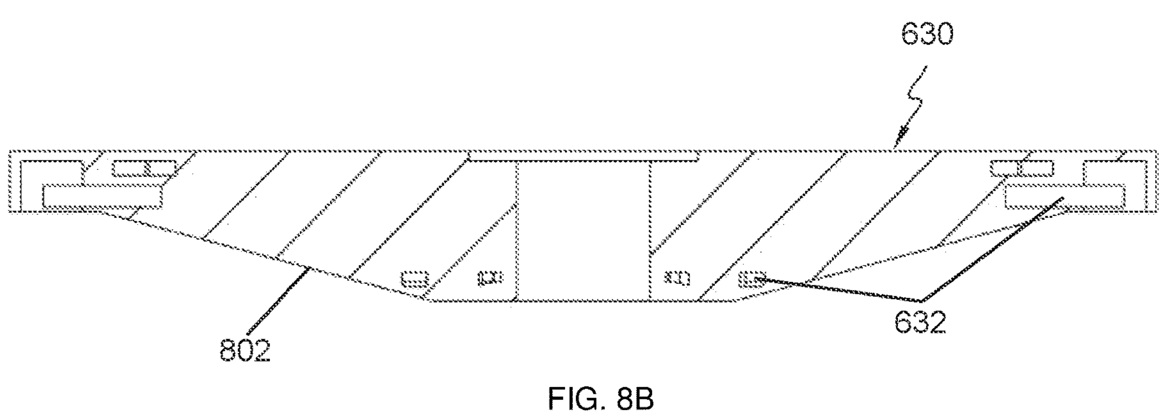
Figure 8C:
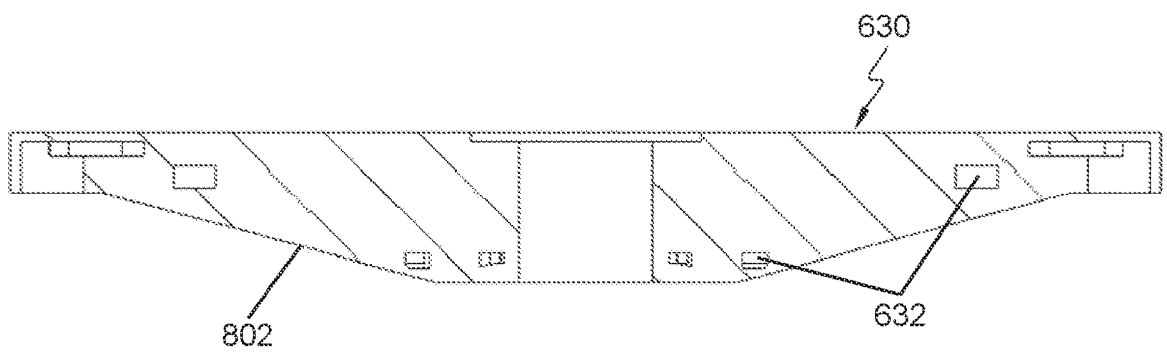
Figure 8D:
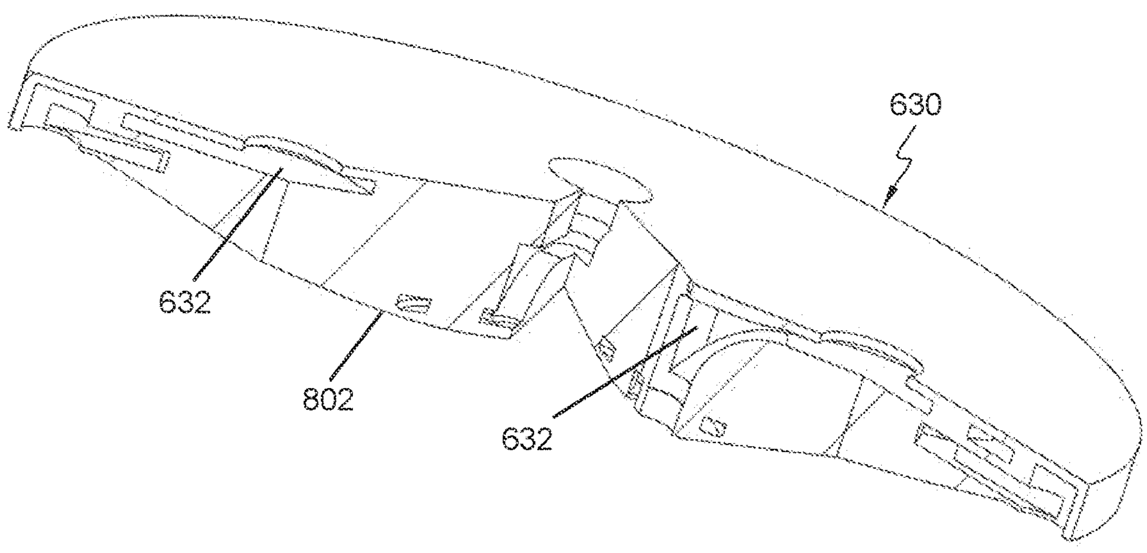
Figure 8E:
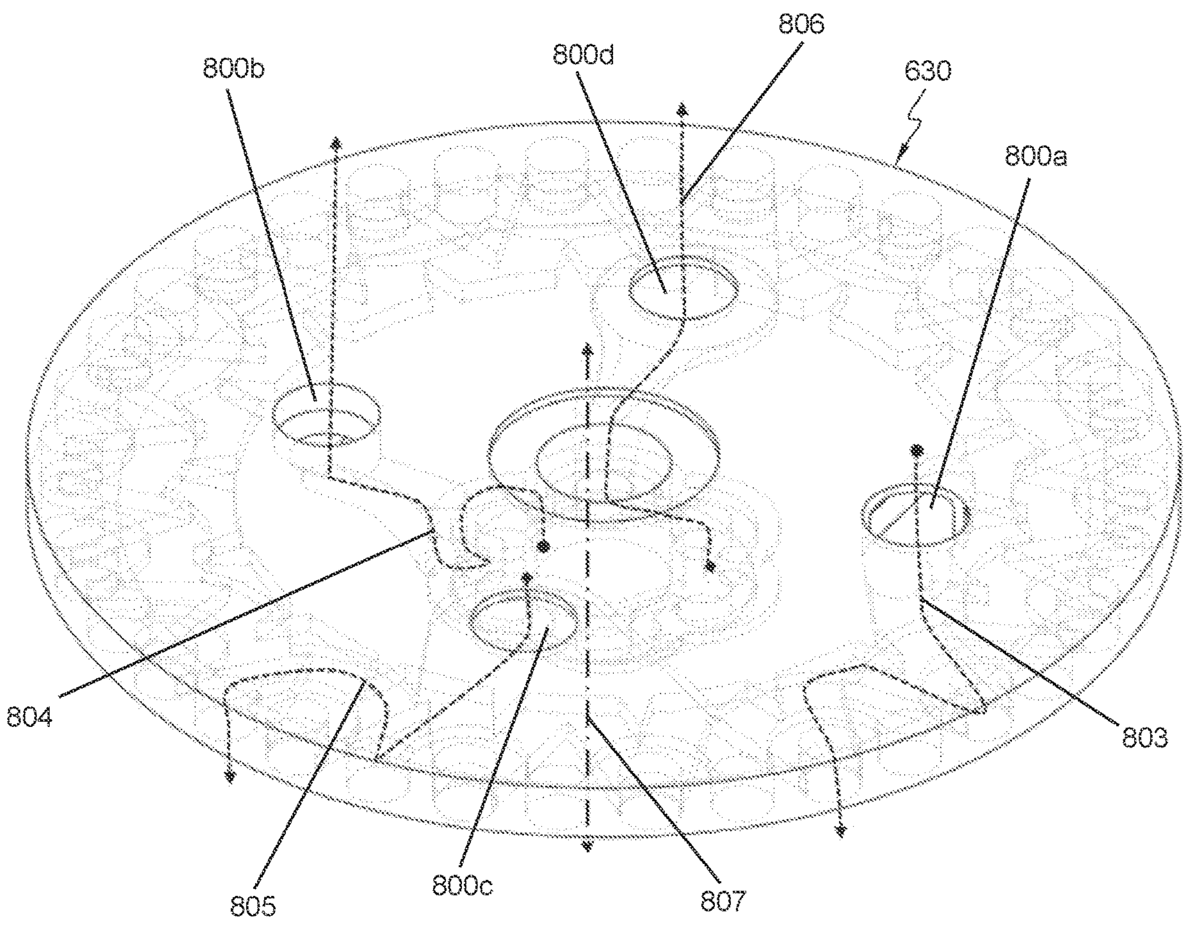

FIGS. 8A-8E depict one embodiment of a compression plate for a stack system such as stack system 600 of FIGS. 6A-6D, in accordance with one or more aspects of the present invention. FIG. 8A is a top plan view of compression plate 630, and FIGS. 8B-8D are cross-sectional views of compression plate 630 of FIG. 8A, taken along lines 8B-8B, 8C-8C, and 8D-8D, respectively, in FIG. 8A. Further, FIG. 8E is an isometric view of compression plate 630 of FIGS. 8A-8D, with exemplary fluid flow lines shown passing through internal distribution/return channels of the compression plate 630.

As noted, FIGS. 8A-8E depict one embodiment of compression plate 630 of the stack system of FIGS. 6A-6D, where fluid openings 800*a*, 800*b*, 800*c*, 800*d* & 800*e*, are illustrated for facilitating flow of fluid through the compression plate, between respective fluid inlets and fluid outlets of the first end plate and the respective fluid transport openings of the cell stack. In addition to fluid openings 800*a*-800*e*, compression plate 630 includes multiple fluid distribution/return channels 632 located and sized to facilitate flow of the respective fluids through the stack system, such as stack system 600 of FIGS. 6A-6D. Note that the size and location of the individual fluid distribution/return channels 632 can vary, depending on the stack system implementation. For instance, flow path 803 depicts an exemplary flow direction for a first reactant (for instance, hydrogen in the case of a fuel cell stack system), fluid path 804 illustrates a return flow direction for the first reactant through the compression plate for output, for instance, through a respective fluid outlet in the first end plate (see FIGS. 6A-6D), which in one embodiment, is aligned with opening 800*b* of compression plate 630. Similarly, opening 800*c* in compression plate 630 is aligned with a second reactant inlet in the first end plate and provides one or more distribution channels for distributing the second reactant (e.g., oxygen in the case of a fuel cell stack system) to the cells of the cell stack, such as described herein. Fluid flow line 806 illustrates a sample flow direction from a center end opening of the cell stack through the compression plate 630 to an opening 800*d* of compression plate 630 aligned, for instance, with a second reactant outlet in the first end plate (in the example of FIGS. 6A-6D). Further, fluid flow 807 illustrates one example of flow direction of coolant from and to a coolant inlet and coolant outlet in the first end plate. For instance, in one embodiment, the coolant flow can be around, along and/or through the center fastener to respective fluid distribution channels of the compression plate and respective coolant inlet and outlet ports in the first end plate of the stack system. As noted above, compression plate 630 is configured with a surface 802 having a non-planar, three-dimensional shape similar to the non-planar, three-dimensional shape of the plate structures in the cell stack of the stack system.

Those skilled in the art will note that the first and second end plates, and the compression plate, described herein are, in one or more embodiments, rigid plates, such as rigid metal plates, sized and configured to maintain the applied compression force between the first and second end plates of the stack system. By way of specific example, where an electrically conductive structural material, such as stainless steel, titanium, aluminum, or other similar material, is selected for the compression plate, the end plate can be any non-conductive, structural-based material compatible with the reactants, such as PPS, G7 or G10 laminates, PSU, PPSU, or others. If the compression plate is made of a non-conductive material such as the aforementioned, then the insulative end plate can be unified into the compressive plate to simplify stack construction at the cost of individual component complexity. In one or more embodiments, the plate sizing can be matched to the cell size so as to minimize stack volume usage in the system and improve stack power density. Fabrication of the compression and/or insulative end plates, where fabricated with distribution/redirect channels internal to the plates, can be performed in a single operation additive manufacturing process, or by adhesive, thermal, physical, or other forms of lamination of various layers, so as to provide unimpeded flow through the designated channels. Alternatively, subtractive processes, such as 4-axis or 5-axis milling, can be used to manufacture the plates if the design accounts for the use of such methods.

As noted, disclosed herein are new types of stack systems with, for instance, enhanced fastener configurations and enhanced flow of fluid through the cell stacks of the stack system which are implemented, in one or more embodiments, in combination with plate structures and/or assemblies (i.e., flow-field plates) that have a non-planar, three-dimensional shape, such as disclosed. For instance, in one embodiment, the non-planar, three-dimensional plate structure has a circumferential end and a center end, where the circumferential end is vertically offset from the center end such that the plate structure extends in a z axis direction. In one embodiment, the plate structure is circular-shaped in plan view. In one or more embodiments, the plate structures are secured together by a center fastener connecting, for instance, two end plates of the stack system. Multiple adjustable compression screws, or peripheral fasteners, are also provided to apply respective variable forces onto the cell stack through, for instance, a compression plate, where the respective variable forces are in addition to the compression force on the cell stack applied by the center fastener. Further, in one or more embodiments, one or more of the end plates or the compression plate of the stack system can be configured with a non-planar surface which interfaces with the cell stack to facilitate accommodating the non-planar, three-dimensional-shaped plate structures of the cell stack. In addition, one or more of the end plates or the compression plate in the stack system can include multiple fluid redirect channels internal to end plate connecting in fluid communication selected outer and inner fluid transport openings through the cell stack to redirect fluid through the cell stack back through the cell stack to, for instance, recirculate a fluid through the cell stack, or to facilitate egress of a fluid from, for instance, a respective fluid outlet disposed in the upper end plate of the stack system. In one or more other embodiments, one or more fluid redirect channels are provided within the second end plate, and can include a chamber or reservoir to facilitate collection and passage of a respective fluid through the cell stack.

In one or more embodiments, a center fastener is provided to connect the first and second end plates of the stack system with, in one embodiment, the center fastener being fixedly connected to the second end plate (or base plate). The center fastener includes an at least partially threaded shaft and a compression nut that can be adjusted to axially apply the compressive force on the cell stack, including the non-planar, three-dimensionally-shaped plate structures of the cell stack. In one embodiment, the compressive force is applied through a compression plate, with the applied force creating a seal between the plates of the cell stack and the first and second end plates. The first end plate can also optionally include adjustable compression screws to extend from the first end plate about the center fastener, each to apply a respective variable force onto the cell stack through the compression plate (that is, in addition to the compressive force on the cell stack applied by the center fastener). In one or more embodiments, these adjustable compression screws can apply a leveling and/or fine adjustment compressive force to the cell stack, and in particular, to the plate structures of the cell stack as needed, for instance, due to imperfections or uneven compression in the flow plates using the center fastener. In one embodiment, the center fastener can be sealed to the second end plate or base plate, and configured to allow transport of reactant or coolant along the center fastener to, for instance, unsealed spaces between adjacent plate structures in the cell stack, and/or return of the reactant or coolant to one of the end plates.

In one or more embodiments, the second end plate, or base plate, is fabricated with multiple internal fluid redirect (or recirculation) channels used to connect selected fluid transport openings in the circumferential end and center end of the plate structures in the cell stack. The multiple fluid redirect channels in the base plate can be in lieu of using, for instance, multiple outlet ports, connections, or other manifolds coupled to the base plate. Further, the fluid redirect channels within the base plate can be used to recirculate gaseous or liquid reactants and/or coolant through the cells of the cell stack, again in lieu of having one or more outlet ports, connections or other manifolds coupled to the base plate. Additionally, in one or more embodiments, the fluid redirect channels can be configured with a respective reservoir, such as a reactant or coolant reservoir, and/or as a water trap for fuel-cell-generated water in the case of a fuel cell stack structure, whether gravity-fed or forced by pressure from the cells of the cell stack.

In one or more embodiments, the compression plate and second end plate have an interface surface adjacent to the cell stack configured as a non-planar, three-dimensional-shaped surface to mate with the adjacent plate structures of the cell stack, which as described herein also have a non-planar, three-dimensional shape. The particular shape of the interface surfaces of the compression plate and second end plate can vary with the configuration and shape of the plate structures in the cell stack. In one embodiment, the compression plate has an interface surface, such as interface surface 802 in FIGS. 8B-8D, which is convex in nature to better mate with the adjacent plate structure of the cell stack in the stack system. Similarly, in one embodiment, the second end plate (or base plate) has a concave interface surface, such as illustrated in the example of FIGS. 6C-6D (in one embodiment). In one or more other embodiments, the interface surface of the compression plate can be concave, and the interface surface of the second end plate (or base plate) can be convex to facilitate coupling to a stack structure where the center end of the individual plate structures resides above the circumferential end.

In one or more embodiments, the compression plate and second end plate or base plate can be fabricated with the fluid redirect channels (or distribution/return channels) using additive manufacturing, such as casting, molding, or printing, where the fluids are kept separate, and can even be collected or entrapped, without harm to the reacting plates of the cell stack.

Depending on the implementation, a variety of advantages are obtained with a stack system such as described herein. In one or more implementations, gravity drainage of fluids within the cell stack is possible with, for instance, a basin or reservoir used to collect fluids, or to recirculate fluids, or to return fluids (e.g., return the fluids back through the upper end plate to respective fluid outlets). This configuration provides improved orientation-based performance of the stack system. Further, the plates are self-centering as described, which enhances overall stack assembly and resists shear failure of the stack. Keys, such as rotation key features, prevent incorrect assembly of the plates, for instance, and a center fastener is provided for coarse compression of the stack and adjustable compression screws are provided for fine leveling or fine compression, in one or more embodiments. The cylindrical form of the resultant cell stack, and stack system, is scalable. The end plates of the stack system can be made via additive processing due to the internal fluid channels, or assembled in layers which can be secured together, such as bolted together, to facilitate defining the redirect or distribution paths through the end plates or compression plate. In one or more embodiments, sealing of the individual openings between plates in the cell stack and in the stack system can be via appropriately shaped seals, such as O-rings, and/or by over-molding for two points of failure, if desired. Power density can be designed similar to existing stack systems, or in one or more embodiments, a collector can be integrated into an end plate to reduce the total number of components of the stack system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A stack system comprising:

multiple cells and associated plate structures arranged in a stack;

wherein a plate structure of the multiple cells and associated plate structures has a non-planar, three-dimensional shape, and comprising:

a circumferential end and a center end, wherein the circumferential end and the center end are vertically offset;

a wall structure extending between and connecting the circumferential end and the center end;

a plurality of curving fluid channels on the wall structure extending between the circumferential end and the center end, wherein the plurality of curving fluid channels include a first set of curving fluid channels on one side of the wall structure extending between the circumferential end and the center end, and a second set of curving fluid channels on another side of the wall structure extending between the circumferential end and the center end; and the circumferential end including multiple outer fluid transport openings through the plate structure, and the center end including multiple inner fluid transport openings through the plate structure, wherein one or more outer fluid transport openings of the multiple outer fluid transport openings and one or more inner fluid transport openings of the multiple inner fluid transport openings facilitate, at least in part, flow of a fluid across the plate structure between the vertically offset circumferential end and center end, through the plurality of curving fluid channels.

2. The stack system of claim 1, wherein the first set of curving fluid channels on the one side of the wall structure are differently configured from the second set of curving fluid channels on the other side of the wall structure.

3. The stack system of claim 1, wherein the wall structure extends uniformly between the circumferential end and the center end.

4. The stack system of claim 1, wherein the wall structure curves uniformly between the circumferential end and the center end.

5. The stack system of claim 1, wherein the wall structure curves non-uniformly between the circumferential end and the center end.

6. The stack system of claim 1, wherein the plurality of curving fluid channels comprise a plurality of parallel curving fluid channels on the at least one side of the wall structure extending between the circumferential end and the center end.

7. The stack system of claim 1, wherein spacing between adjacent curving fluid channels of the plurality of curving fluid channels on the at least one side of the wall structure varies between the circumferential end and the center end.

8. The stack system of claim 1, wherein spacing decreases between adjacent curving fluid channels of the plurality of curving fluid channels on the at least one side of the wall structure from the circumferential end to the center end of the plate structure.

9. The stack system of claim 1, wherein cross-sectional area of one or more curving fluid channels of the plurality of curving fluid channels varies between the circumferential end and the center end.

10. The stack system of claim 1, wherein two or more adjacent curving fluid channels of the plurality of curving fluid channels on the at least one side of the wall structure merge between the circumferential end and the center end into a single fluid channel.

11. The stack system of claim 1, wherein the circumferential end is a circular circumferential end and the center end is a circular center end, and wherein the stack system is a cylindrical-shaped stack system.

12. A stack system comprising:

multiple cells and associated plate assemblies arranged in a cell stack;

wherein a plate assembly of the multiple cells and associated plate assemblies has a non-planar, three-dimensional shape, and comprising:

a first plate structure and a second plate structure sealed together to form the plate assembly, the first and second plate structures each comprising:

a circumferential end and a center end, wherein the circumferential end and the center end are vertically offset;

a wall structure extending between and connecting the circumferential end and the center end;

a plurality of curving fluid channels on at least one side of the wall structure extending between the circumferential end and the center end; and the circumferential end including multiple outer fluid transport openings through the plate structure, and the center end including multiple inner fluid transport openings through the plate structure, wherein one or more outer fluid transport openings of the multiple outer fluid transport openings and one or more inner fluid transport openings of the multiple inner fluid transport openings facilitate, at least in part, flow of a fluid across the plate structure between the vertically offset circumferential end and center end through the plurality of curving fluid channels.

13. The stack system of claim 12, wherein the plate assembly is a bipolar plate assembly, and wherein the plurality of curving fluid channels of each of the first and second plate structures include a first set of curving fluid channels on one side of the wall structure extending between the circumferential end and the center end, and a second set of curving fluid channels on another side of the wall structure extending between the circumferential end and the center end.

14. The stack system of claim 13, wherein the first set of curving fluid channels on the one side of the wall structure are differently configured from the second set of curving fluid channels on the other side of the wall structure.

15. The stack system of claim 13, wherein the one or more outer fluid transport openings of the multiple outer fluid transport openings and the one or more inner fluid transport openings of the multiple inner fluid transport openings facilitate, at least in part, flow of the fluid through the plate assembly, between the first and second plate structures.

16. The stack system of claim 15, wherein the fluid is a coolant which flows between the first and second plates structures, and wherein one or more other fluids pass across another side of the wall structure of one or more of the first plate structure and the second plate structure, the one or more other fluids being one or more reactant fluids of the stack system.

17. The stack system of claim 12, wherein the wall structure of each of the first and second plate structures extends uniformly between the circumferential end and the center end.

18. The stack system of claim 12, wherein the wall structure of each of the first and second plate structures curves uniformly between the circumferential end and the center end.

19. The stack system of claim 12, wherein the wall structure of each of the first and second plate structures curves non-uniformly between the circumferential end and the center end.

20. The stack system of claim 12, wherein the plurality of curving fluid channels of each of the first and second plate structures comprise a plurality of parallel curving fluid channels on the at least one side of the wall structure extending between the circumferential end and the center end.

21. The stack system of claim 12, wherein spacing between adjacent curving fluid channels of the plurality of curving fluid channels on the at least one side of the wall structure of each of the first and second plate structures varies between the circumferential end and the center end.

22. The stack system of claim 12, wherein spacing decreases between adjacent curving fluid channels of the plurality of curving fluid channels on the at least one side of the wall structure of each of the first and second plate structures from the circumferential end to the center end of the plate structure.

23. The stack system of claim 12, wherein cross-sectional area of one or more curving fluid channels of the plurality of curving fluid channels of each of the first and second plate structures varies between the circumferential end and the center end.

24. A fuel cell stack system comprising:

a plurality of stacked fuel cells, the plurality of stacked fuel cells including a plurality of membrane electrode assemblies and one or more plate assemblies, a plate assembly of the one or more plate assemblies having a non-planar, three-dimensional shape, and being disposed between membrane electrode assemblies of adjacent fuel cells of the plurality of stacked fuel cells, and the plate assembly comprising:

a first plate structure and a second plate structure sealed together to form the plate assembly, the first and second plate structures each comprising:

a circumferential end and a center end, wherein the circumferential end and the center end are vertically offset;

a wall structure extending between and connecting the circumferential end and the center end;

a plurality of curving fluid channels on at least one side of the wall structure extending between the circumferential end and the center end; and the circumferential end including multiple outer fluid transport openings through the plate structure, and the center end including multiple inner fluid transport openings through the plate structure, wherein one or more outer fluid transport openings of the multiple outer fluid transport openings and one or more inner fluid transport openings of the multiple inner fluid transport openings facilitate, at least in part, flow of a fluid across the plate structure between the circumferential end and the center end through the plurality of curving fluid channels.

* * * * *